United States Patent
Harenberg, Jr.

[15] 3,678,256
[45] July 18, 1972

[54] PERFORMANCE AND FAILURE ASSESSMENT MONITOR

[72] Inventor: Harold L. Harenberg, Jr., Long Beach, Calif.

[73] Assignee: McDonnell Douglas Corporation

[22] Filed: Oct. 5, 1970

[21] Appl. No.: 78,073

[52] U.S. Cl. .......................................... 235/150.2, 244/77 M
[51] Int. Cl. ................................................ G06g 7/78
[58] Field of Search .................... 235/150.2; 244/77 A, 77 B, 244/77 D, 77 M

[56] References Cited

UNITED STATES PATENTS

| | | | |
|---|---|---|---|
| 3,443,073 | 5/1969 | Cohen | 235/150.2 |
| 3,096,433 | 7/1963 | Daspit et al. | 244/77 B |

Primary Examiner—Eugene G. Botz
Assistant Examiner—R. Stephen Dildine, Jr.
Attorney—Walter J. Jason, Donald L. Royer and George W. Finch

[57] ABSTRACT

A performance and failure assessment monitor which assesses overall performance of the operation of the automatic landing mode of a flight control system for an aircraft. The monitor is connected to various sensors throughout the aircraft so that it can compare what the flight control system of the aircraft is accomplishing during a landing maneuver against an independent model generated within the monitor of what the flight control system should be accomplishing. The resultant comparison is displayed to the pilot as a measure of relative confidence that the landing will be accomplished properly. The monitor also includes failure verification and failure reversion control for making immediate and accurate assessments of the consequence of a failure of any component in the aircraft which in anyway affects the ability of the flight control and flight guidance instrument systems to operate properly, for correcting the failure when possible and for displaying only the critical failure information to the pilot of the aircraft.

30 Claims, 26 Drawing Figures

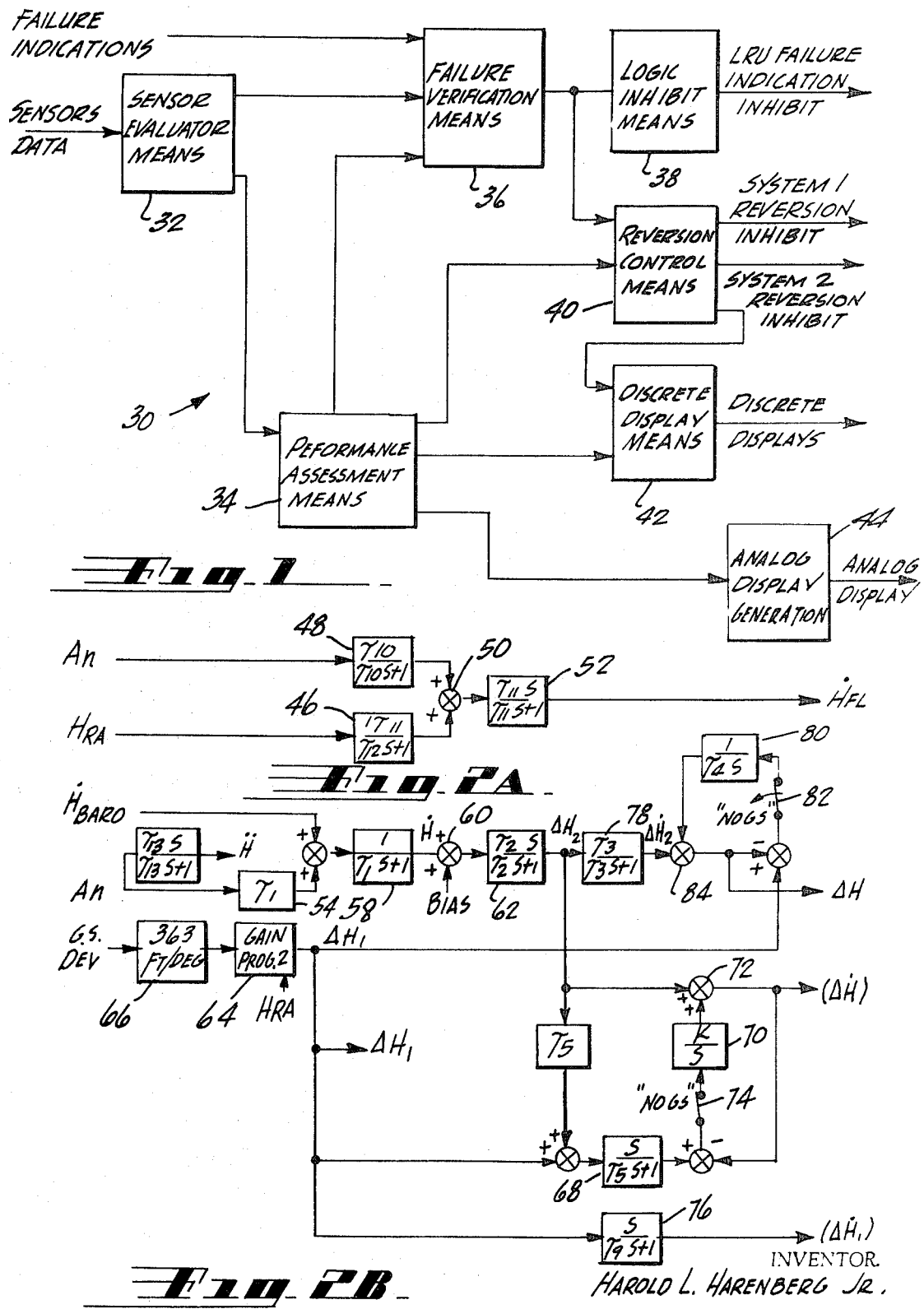

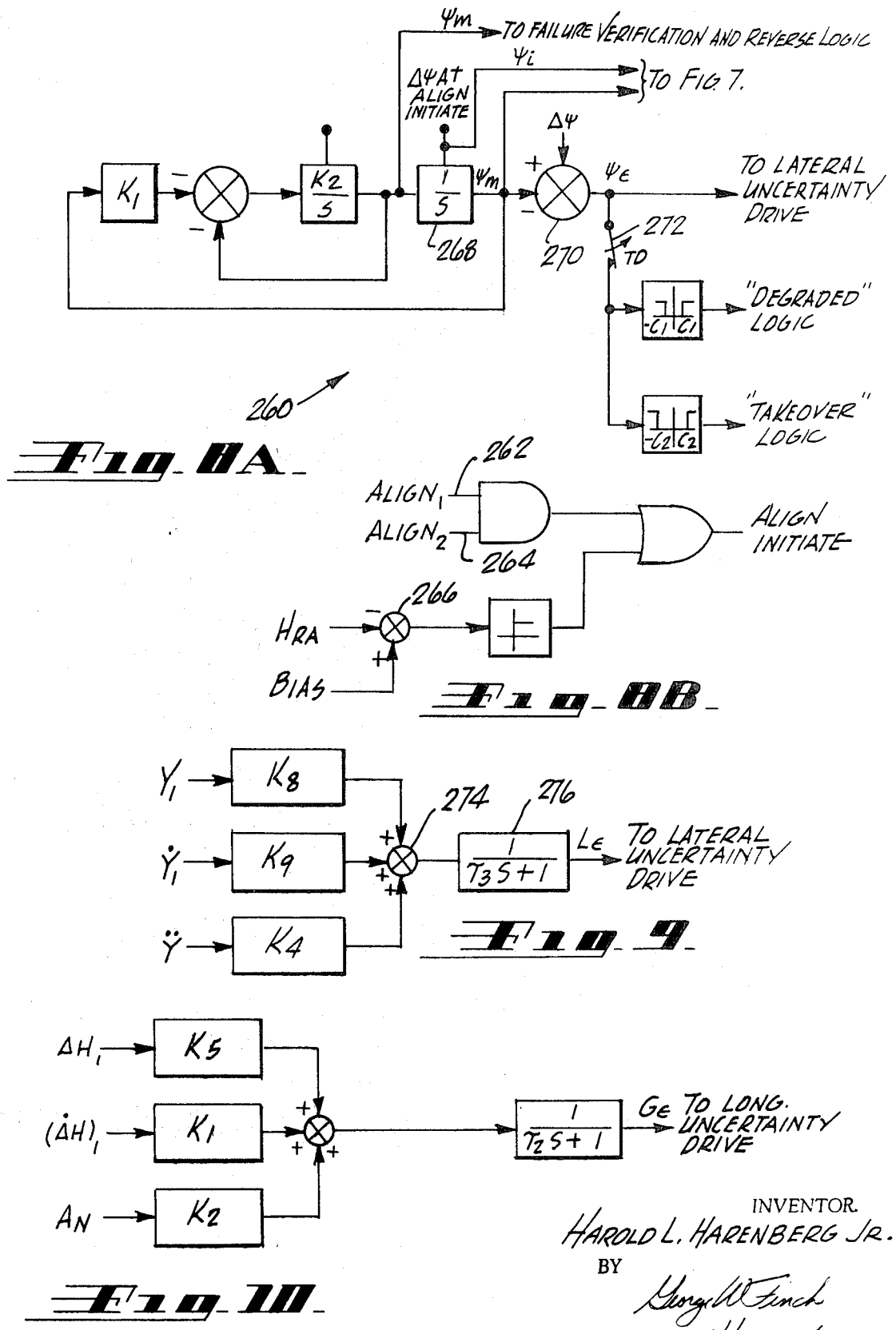

INVENTOR.
HAROLD L. HARENBERG JR
BY George W. Finch
-Attorney-

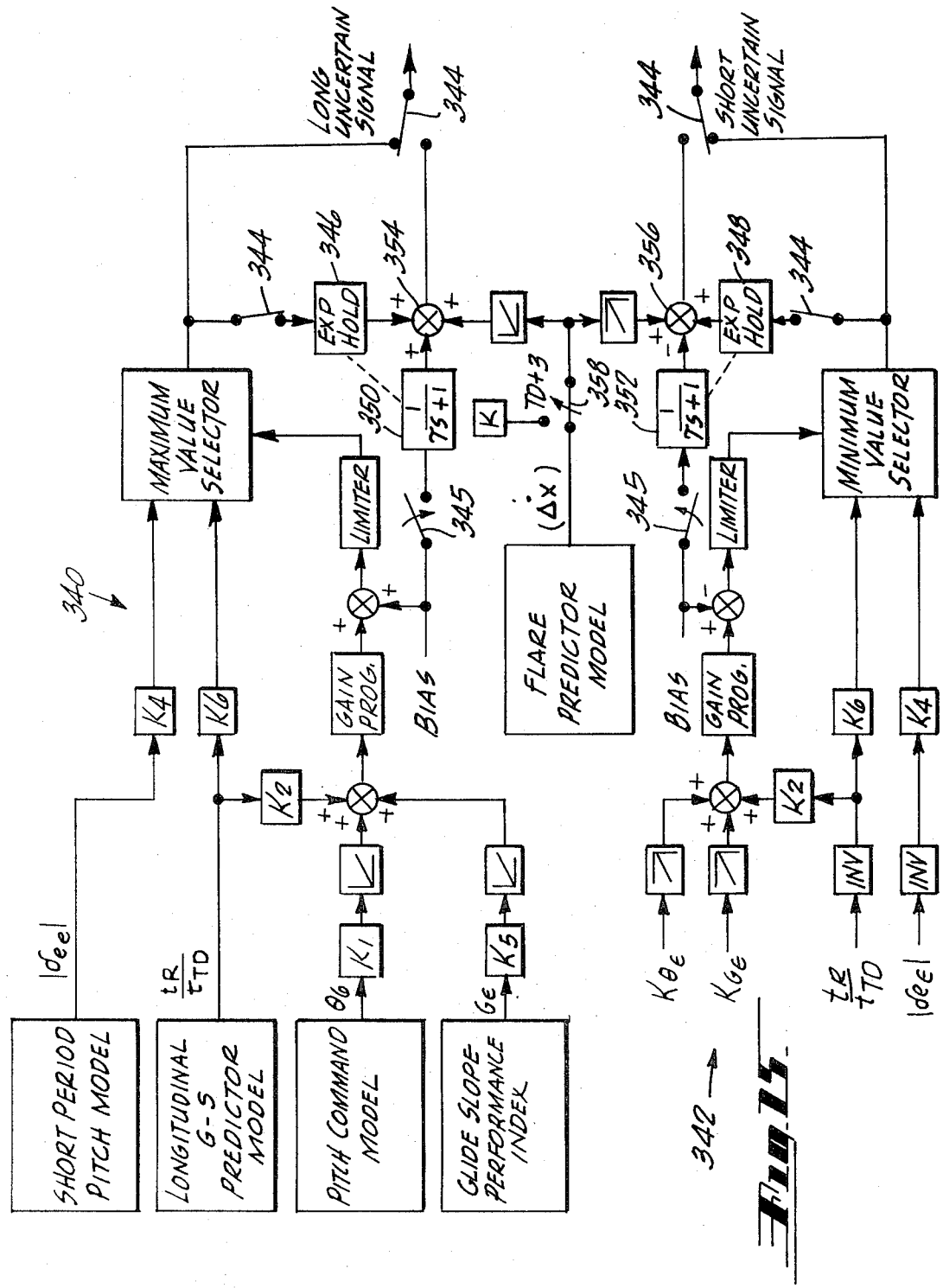

INVENTOR.
HAROLD L. HARENBERG JR.

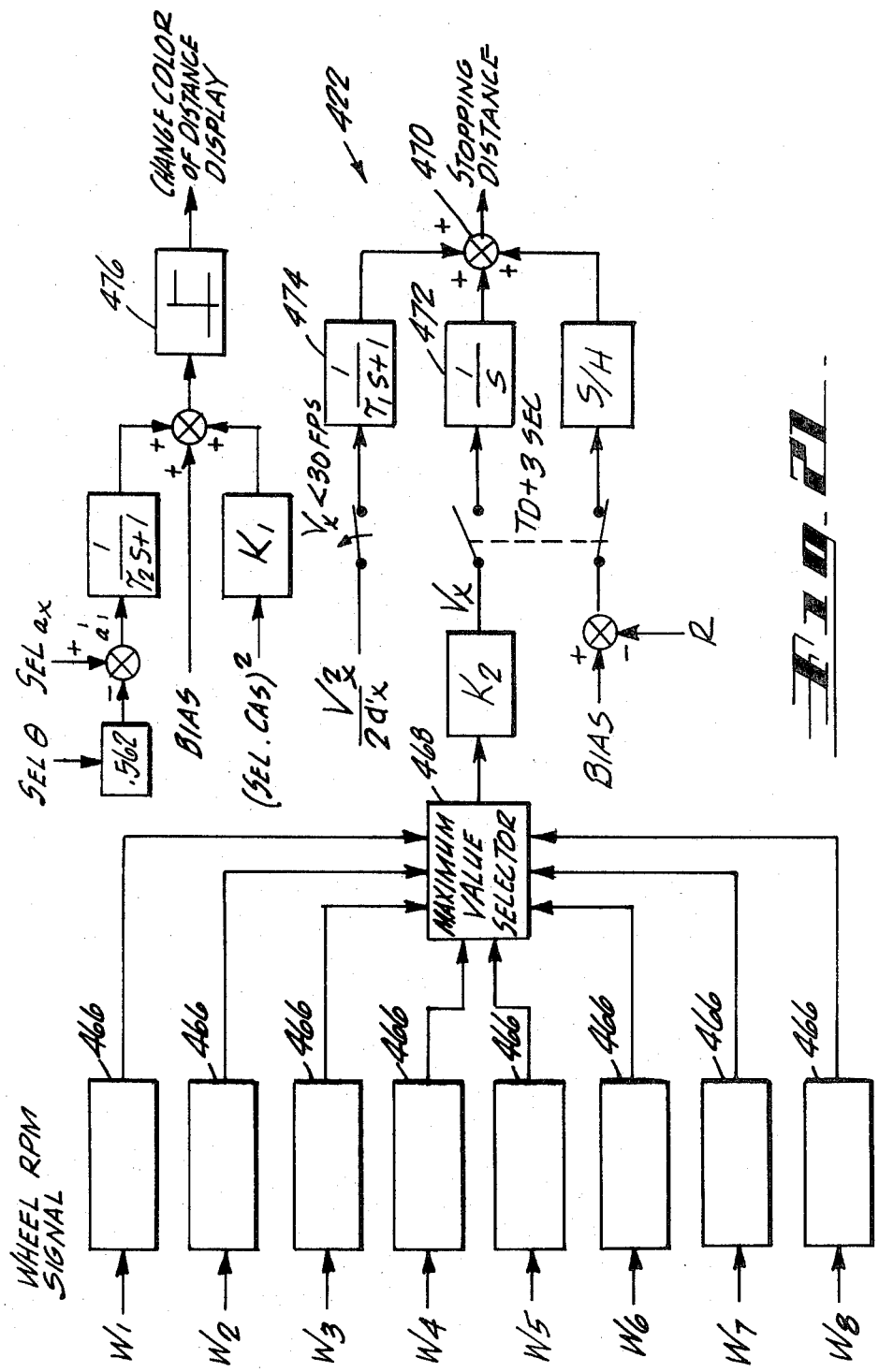

PERFORMANCE AND FAILURE ASSESSMENT MONITOR

BACKGROUND OF THE INVENTION

All weather landing systems are becoming particularly desirable to the commercial aircraft industry since the expense of weather caused delays and/or landings at alternate landing fields is becoming economically prohibitive. Various all weather landing systems have evolved in the past. These systems have not, however, included means for indicating the landing system is operating properly which instill enough confidence in the pilot that he will consistently allow the system to control a fully automatic landing with passengers on board the aircraft.

The prior-art approach to performance and failure monitoring for all weather landing systems such as shown in Sebern, U. S. Pat. No. 3,439,321, is based on the following two principles: component failures can be detected by comparing the output signals from an active component with like signals from redundant components or with fixed predetermined reference signals; and secondly, satisfactory landing performance can be inferred from the fact that all components of the landing system are operating within specified tolerances as indicated by the component failure test above. The current popularity of this approach in the monitoring of complex all weather landing systems is based on the fact that it is extremely difficult to define the criteria which describe a satisfactory landing maneuver, and that it is even more difficult to devise a method of measuring compliance with such criteria.

The object of present automatic flight control systems is to exercise a varying degree of precise control over a known region of operation for the aircraft. One limitation of this concept is that in practice, a precise description of the total range of possible aircraft operation has never been required. Designers have tended to halt the design of their automatic flight control systems at a point where a reasonable degree of control is achieved. This practice is prevalent because the pilot is always present to assume the role of predictor controller in those areas of flight for which the automatic flight control system is known to provide inadequate control. The result is that over a limited range of operation, the present automatic flight control systems do a reasonable job of controlling the aircraft. However, as the performance limits of such a system are approached, the performance of the subsystems therein becomes anomalous and they may actually tend to fight one another in accomplishing their respective functions causing the complete break down of the system during large exclusions from "nominal" operation. In addition, the functioning of one system on the aircraft is usually dependent upon proper operation of several associated but relatively independent sub-systems, which may or may not have been designed with this aspect of system dependence in mind. Specifically, most autopilots require a longitudinal trim system to keep the aircraft in a dynamic response range for which the control laws implemented in the autopilot are valid. A similar situation exists between the autopilot and the speed control system.

When prior art monitor techniques are applied to systems of this type, they monitor only the functional performances of each component part of the autopilot, and of the various sub-systems and as long as every component is working within prescribed tolerances, it is assumed that the aircraft is being controlled in a satisfactory manner. Such prior art monitor systems are thus twice removed from the actual performance of the aircraft and may be subject to dangerous errors, as when the sub-systems are fighting one another dynamically, yet none of the sub-systems are outside their monitored tolerances.

SUMMARY OF THE INVENTION

A successful landing may be viewed as a dynamical process in which the controlled aircraft successfully attains a series of defined "terminal states" which are related to the various maneuvers associated with approach and landing without exceeding maneuver limit criteria. For instance, a successful touchdown may be defined in terms of the longitudinal and lateral spatial coordinates, the instantaneous vertical velocity, the altitude (pitch, roll and yaw) and the forward velocity of the aircraft at ground intercept. Therefore, any valid assessment of landing performance status must assure, to a high degree of confidence, that all of these variables will be contained within well-defined bounds at touchdown. A definitive interpretation of what is required to make this assessment is as follows: If the aircraft is not at the center of the Instrument Landing System (ILS) cone the activity of the autopilot must be consistent with proper control action to return the aircraft to the center thereof. There also must be some indication that the flight control system is capable of returning the aircraft to the center of the ILS cone and is capable of achieving relatively stable conditions before the aircraft touchdown. This estimation must account for prevailing environmental conditions and aircraft attitude limits. There must also be some indication that the ILS beams forming the cone are not shifting as a result of interference to the extent of adversely effecting the landing. The short term control response of the aircraft must be checked to afford confidence that the aircraft is capable of performing the high response flare maneuver immediately before touchdown. Also it should be ascertained in advance that adequate control authority is available to command the flare rotation of the aircraft. Lastly, the removal of heading error prior to touchdown due to cross winds and the like and the containment of forward velocity within tolerable limits must be verified. The present performance and failure assessment monitor accomplishes all these requirements.

It should be realized that the pilot is necessarily the primary monitor of any automatic landing because of his responsibility to the passengers and his natural instinct for his own safety. For this reason, an extremely high level of pilot confidence is required if automatic landing systems are to achieve the levels of utilization demanded by their cost. Given the basic propositions that: the landing maneuver can be safely controlled by a fully automatic fail operational system; and that the landing maneuver including the portions thereof enumerated in the preceding paragraphs must be monitored in the absolute sense by the pilot to assure his confidence in the system, there must be some means to accomplish a satisfactory interface between the system and the pilot. The performance and failure assessment monitor described herein is intended to provide this interface.

The present invention accomplishes the above mentioned interface by providing means by which the pilot can observe and monitor the overall landing process. This concept as embodied in the present monitor is unique both as to the scope and the depth of the monitoring function. The performance of a landing maneuver is evaluated at the highest level of relevancy, namely, the spatial relationship which exists between the controlled aircraft and the ground reference and the character of the operational environment. Likewise, the operational status of the automatic landing system itself is assessed and controlled in terms of the degree to which each subsystem therein is or is not contributing to the successful completion of the landing maneuver. A landing status assessment of this depth permits the pilot to monitor at a very high functional level. At this level his decisions are likely to be derived from the exercise of judgement in chosing between weighted alternatives rather than from a subjective interpretation of some lesser observation of the landing process.

The fundamental aspect of the present performance and failure assessment monitor is the incorporation of predictor means. The predictor means include various models which essentially duplicate, in a simplified manner, the automatic control system guidance laws and the aircraft dynamic responses to autopilot or pilot commands. Using these models, the predictor means are able to extrapolate the approximate future position of the aircraft from knowledge of the existing state at any given time. This information is used to provide a readout of the expected landing coordinates and probability information as to whether a relatively stable condition of the aircraft will be achieved for a reasonable time prior to touchdown.

For example, if the automatic landing system fails to operate at all, the trajectory predicted by the predictor means will not correlate with the actual path of the aircraft and thus the monitor will signal the failure.

The presence of external environmental conditions such as wind shear or gusts is assessed by the observation of an irregularity of the aircraft trajectory compared to a maneuver subject to no external forces and by the observation of the trend of the prediction trajectories, that is, even though an early prediction does not account for the effects of subsequent external disturbances, the projections by the predictor means are continuously updated so the effect of these disturbances on the landing conditions becomes apparent in subsequent predictions.

The other external factor that can influence an automatic landing is irregularity of the ground radiation pattern by the ILS such that the localizer and glide slope beams projected thereby do not define a straight and true path to touchdown. In this event the aircraft, as controlled by the autopilot, will try to follow the beams wherever they direct. If the bends are present in the localizer or glide slope beam or if the ground facility fails to generate a good beam within a few hundred feet of the ground, a critical situation can be created where the aircraft is diverted so far from the proper approach path that it cannot be returned to the path in time to make a safe landing. The onset of this critical condition is identified almost immediately by the predictor means so that other means such as inertial means are switched in to guide the aircraft to a proper touchdown or the pilot is warned to stop the approach and "go around" while he still has the opportunity.

The present performance assessment monitor not only can be used to assure that the approach and touchdown phases of an automatic landing are safely completed, it can also be used to monitor the aircraft during the landing roll to indicate to the pilot whether or not the automatic landing system will control the aircraft within certain limits on the runway and whether his braking will safely stop the aircraft on the runway.

The present performance assessment monitor can also be used as a manual approach monitor to provide monitoring capability for the flight director mode of landing operation. This is accomplished by utilizing the same performance functions and models in the predictor means as for a fully automatic landing but with modification of the command lags therein and the inclusion of wider tolerances in altitude and attitude control since the response of aircraft when being controlled manually is different than the response thereof when being controlled by an autopilot. In such a manner, the system can also be used as a training aid so that trainee pilots have means to warn them of approaching problems during a landing maneuver.

It is an object of the present invention to provide means for monitoring the operational status of an automatic flight control system and of the associated systems in an aircraft to determine to what degree each system is or is not jeopardizing the successful completion of a landing maneuver.

Another object is to provide a performance assessment monitor which will evaluate for validity all failure indications as sensed by subsystem failure monitors.

Another object is to provide a performance assessment monitor which upon verification of sensed failures in the operative components of the landing system will assure proper reversion switching within the landing system to assure the safety of the landing maneuver.

Another object is to provide a display system for an aircraft which operates with the concurrence of the pilot, but without the need of subjective interpretation by him, to manage the elements and subsystems which provide flight control to the aircraft to achieve a maximum probability of success during approach and landing.

Another object is to provide means for continuously determining the probable success of an impending landing and for evaluating available alternatives so that the combination of control elements or subsystems which will maximize the probability of a safe landing or the probability of a successful missed approach in the event that a safe landing becomes improbable, are selected.

Another object is to provide a performance assessment monitor which will annunciate to the pilot all failures which effect the safety of the landing maneuver but which will not annunciate to the pilot those failures which will not lead to degraded landing performance or safety.

Another object is to provide to the pilot a continuously updated display of just how the landing maneuver is progressing and how it is likely to continue to progress.

Another object is to provide a performance assessment monitor capable of informing the pilot as to the functional operating status of his guidance displays.

Another object is to provide a performance assessment monitor which is fail passive and fail obvious for all internal failures.

Another object is to provide a performance and assessment monitor which provides a satisfactory interface between the automatic landing system of the aircraft and the pilot.

Another object is to provide a system whose function may be readily extended to control the aircraft directly in lieu of the basic autopilot through a slight increase im complexity of the present command models, and to control the end conditions of the maneuvers associated with approach and landing by processing the outputs of the predictor means to modify the dynamic characteristics of the basic autopilot of the aircraft.

Another object is to provide a new approach for control of component failure validation and subsystem disconnect. Component integrity is interpreted in terms of its effect on the aircraft performance during the maneuver in question, with resulting system disconnect governed accordingly. One specific implementation to realize this strategy includes: disconnect action based on component (i.e., sensor) failure indications is delayed for an extended interval unless the indication is associated with; a condition of degraded performance as determined by the performance assessment means, or a condition in which a satisfactory match is not obtained between the sensor signal, processed as necessary for comparison purposes, and an equivalent signal derived from other dissimilar but related sensors.

Another object is to provide a logic system which manages the failure logic signals from the guidance system and associated sensors to individually relate associated failure indications and aircraft performance to determine their reality and meaning, select sensor data for use in landing performance evaluation, and control resultant output signals indicating status of the landing operation and allowing reversion of the operational configuration of the flight guidance system.

Another object is to provide an information system to continuously display the status and probable success of the landing process, and inform the pilot of any failure judged to be critical to the successful completion of the landing process.

Another object is to provide a management system which has authority to inhibit automatic shutdown of the flight guidance and control sub-systems, and which, in the event of abnormal conditions, has the authority to display a takeover command with a recommendation for specific subsequent action by the pilot.

Another object is to provide a monitor system which can easily be extended into a guidance system by proper display of information available therein.

Another object is to provide means for adjusting a variable-gain autopilot to achieve near-optimal performance and simultaneously providing a definitive assessment of the resulting performance.

These and other objects and advantages of the present performance assessment monitor will become apparent after considering the following detailed specification which covers pertinent portions thereof in conjunction with the accompanying drawings wherein:

BRIEF DESCRIPTION OF THE DRAWINGS

FIG. 1 is a block diagram of the present performance and failure assessment monitor;

FIGS. 2A, 2B and 2C are diagrams of state variable derivation means;

FIGS. 8A and 8B are a diagram of an align model;

FIG. 9 is a diagram of means to compute a localizer performance index;

FIG. 10 is a diagram of means to compute a glide slope performance index;

FIG. 15 is a diagram of longitudinal prediction uncertainty computation means;

FIG. 17 is a diagram of variable derivation for go-around altitude loss calculation means;

FIGS. 20A and 20B are a diagram of a rollout steering monitor; and

DESCRIPTION OF THE PRESENT EMBODIMENTS

Figure 2C:
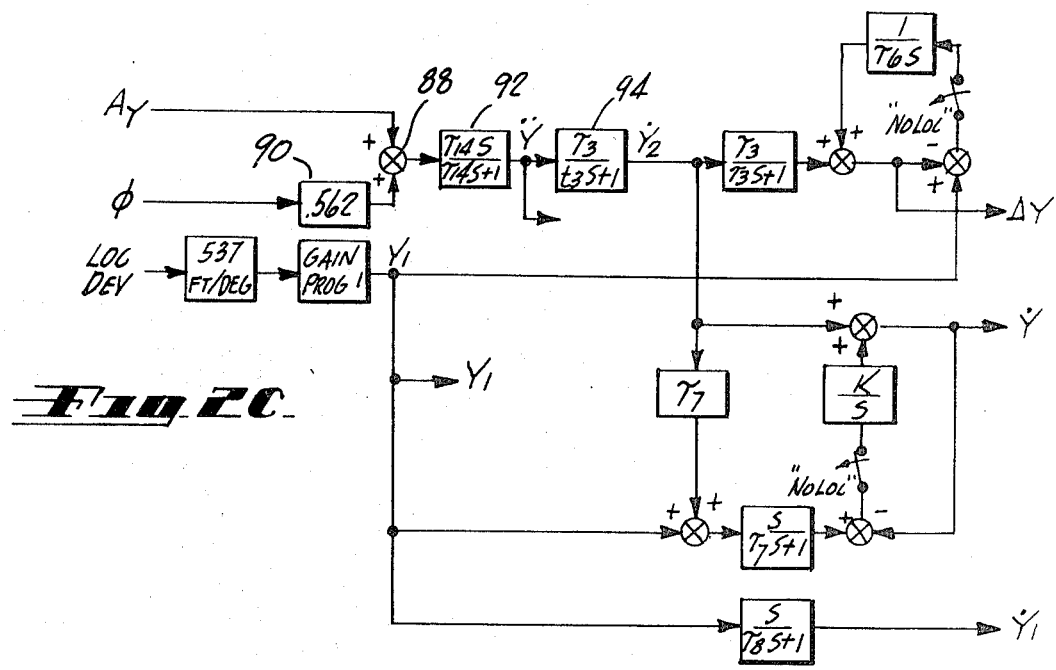

Referring to the drawings more particularly by reference numbers, number 30 in FIG. 1 refers to a performance and failure assessment monitor (PAFAM) of the present invention with the essential operative portions thereof shown. The PAFAM 30 includes sensor evaluator means 32 which are connected to receive inputs from various sensors throughout the aircraft. The sensor data evaluator means 32 in the present embodiment convert sensor data to a useable form for use elsewhere in the PAFAM 30. The means 32 compare signals from like sensors or with signals derived from the combination of sensor data from dissimilar sensors to discover disagreement and to provide a validated set of best data from each sensor array to performance assessment means 34. In the case of attitude and radio sensors, for example, a valid set of data consists of the output of a good sensor, while for actuator position transducers the average of the associated transducers is used. Disagreement signals from the sensor evaluator means 32 are also supplied to failure verification means 36.

The failure assessment function is performed by failure verification means 36, logic inhibit means 38 and reversion control means 40. These components perform a logical accumulation of fail signals for the purpose of confirming the existence of a failure, generate the appropriate indications to the flight crew and maintenance personnel by means of maintenance indicators and other annunciators, and also allow reversion of the failed sub-system.

The existence of a failure is verified in the failure verification means 36 by combining the indication of the failure signal from the failed component with logically associated failure indications or disagreement between like signals downstream of the failure. The indication may also be confirmed by a correlated signal from the performance assessment means 34, indicating degraded aircraft performance or sub-system performance. If no other indication verifies a particular failure, it may still be confirmed by a time weighted factor which accumulates short period repetitive failure indication signals as well as steady failure indication signals.

The output of the failure verification means 36 is fed to the logic inhibit drivers 38 and the reversion control means 40. The logic inhibit means maintain an inhibit signal over the failure logic and each line replaceable unit (LRU) of the monitored flight control system until a failure is confirmed at which time the inhibit is lifted, permitting the LRU to annunciate its failure through the appropriate fault annunciation indicator or in critical cases, to the pilot.

The reversion control means 40 have inputs both from the performance assessment means 34 and the failure verification means 36. The reversion control means 40 operate to lift the inhibit function thereof to allow a failed system to switch itself out. This is accomplished when the failure indication is confirmed as described above. The reversion control means 40 also have an output connected to the discrete display generation means 42.

The discrete display generation means 42 have inputs connected to receive outputs from the reversion control means 40 and the performance assessment means 34. The discrete display generator 42 then energizes indication means to annunciate the preferred pilot action, based upon knowledge of the verified failures within the flight control system.

The above mentioned performance assessment means 34 process information concerning the aircraft's dynamic and navigational behavior and determine whether the impending landing is likely to be successful and feed this information to display means 44. This determination is based upon the existing state of the monitored automatic landing system and the environment within which the system is operating.

The performance assessment means 34 are divided into two relatively independent portions; a fast-time "predictor" portion and a real time portion. The fast-time portion is used to predict the touchdown point of the aircraft in longitudinal and lateral directions while the real time portion determines the extent of the external disturbances and the acceptability of autopilot response. The real time portion also produces a state variable derivation which is the combination of earth reference signals from various sensors on the aircraft with ratio beam signals from the ILS. Means are provided to derive the best available aircraft positional and velocity information (position, rate and acceleration) relative to the nominal navigation reference.

For clarity and convenience the following figures use analog symbology to define the functional requirements of one example of typical performance assessment means 34. The symbology includes selected Laplace transfer functions with various properly chosen time constants $\tau$ and blocks showing graphically the input-output relationship thereof with the abscissa as the input axis and the ordinate as the output axis.

STATE VARIABLE DERIVATION

The basic approach aid used today by an autopilot in an aircraft or by the pilot making an instrument landing is the radio ILS beams. Since these beams, under certain circumstances, have bends and noise, the PAFAM 30 removes as much as it can of the high frequency noise while maintaining the correct phasing of the low frequency information contained therein.

The state variable derivation means for deriving the aircraft variables is shown in block diagram form in FIG. 2 and includes 3 different sections labeled FIGS. 2A, 2B, and 2C.

FIG. 2A shows the derivation of the sink speed $\dot{H}_{FL}$ used during the flare maneuver. This sink speed $\dot{H}_{FL}$ is accurate when the terrain over which the aircraft is decending is relatively smooth. The sink speed $\dot{H}_{FL}$ is derived by filtering the radio altitude $H_{RA}$ and the lagged normal acceleration $A_n$ through filters 46 and 48 respectively, adding the outputs of the filters 46 and 48 in a summer 50 and a combining filter 52. The high frequency information component of the sink speed is obtained from the normal accelerometer on the aircraft while the radio altimeter thereon supplies low frequency data.

Figure 5:
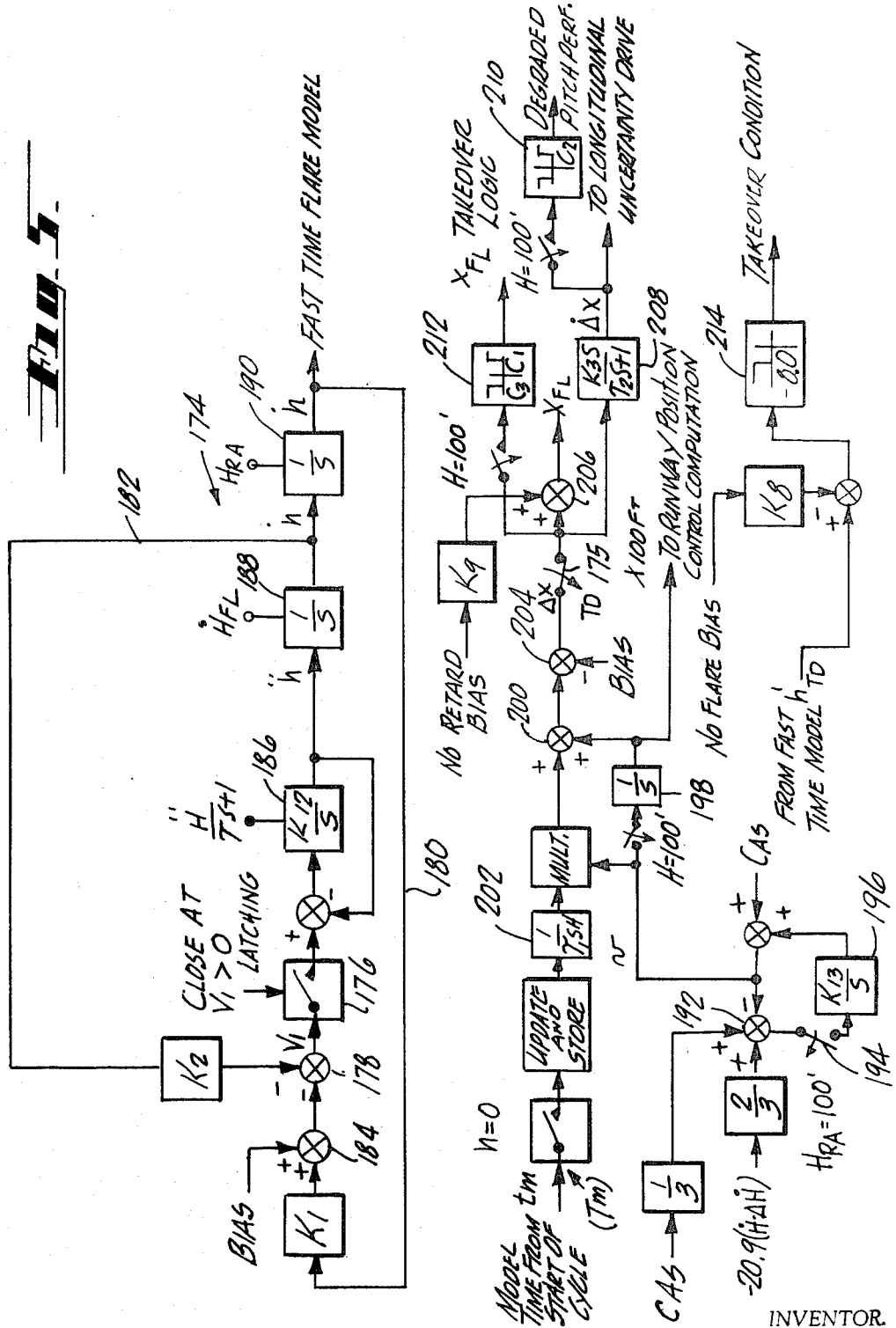
FIG. 5 is a diagram of a flare predictor model.

FIG. 2B shows a means for deriving longitudinal axis variables used prior to flare, $\Delta H$, $\Delta H_1$, $(\Delta \dot{H})$, $(\Delta \dot{H}_1)$ and $\ddot{H}$ in which the altitude acceleration signal $A_n$ is passed through a simple, first order washout filter 54 to remove any null offsets the accelerometer signal may contain prior to its use to initialize the flare predictor model, FIG. 5. The earth reference sink speed $\dot{H}$ is obtained by adding the barometric altitude rate $\dot{H}_{BARO}$ and the normal accelerometer signal in summer 56 and passing the resultant signal through filter 58. To obtain the change in vertical speed ($\Delta \dot{H}_2$), the filtered output $\dot{H}$ is added to a constant representing the nominal sink speed in summer 60 and is then passed through a high pass filter 62 to remove any offsets. This output ($\Delta \dot{H}_2$) is the change in vertical speed with respect to the earth reference. However, since the change of vertical speed ($\Delta \dot{H}$) which is of interest is with reference to the ILS glide slope beam, the signal ($\Delta \dot{H}_2$) representing the change in vertical speed in the earth axis system is combined with a beam rate signal $\Delta \dot{H}_1$.

The radio signal labeled G.S. DEV. is converted into feet by a gain program 64 and a conversion factor 66. The gain program 64 is required due to the convergent characteristics of the ILS beam. The correct input to the gain program 64 is range from the ILS transmitter but since this information is usually not available, the co-location of ILS and Distance Measuring Equipment (DME) being rare, the radio altitude $H_{RA}$ is combined with the converted beam deviation signal G.S. DEV. within the gain program 64 to derive a range. The constant shown (0.363) is the value of the conversion factor when the gain program 64 has a unity value and the aircraft is on the ILS beam center at 1000 feet altitude. The beam deviation signal $\Delta H_1$ is combined through a complementary filter 68 to form a rate signal. The output of the complementary filter 68 is processed through a synchronizer composed of integrator 70 and the associated loop and added to the inertial rate signal ($\Delta \dot{H}_2$) in summer 72 to obtain the final rate signal ($\Delta \dot{H}$) for use elsewhere in the performance assessment portion 34 of the PAFAM 30. The output of the synchronizer is identical to the output of the complimentary filter 68 if the gain $K_1$ thereof is infinite. As the value of the gain $K_1$ is reduced, the output ($\Delta \dot{H}$) is not identical to the filter output. However, the gain $K_1$ can be set to a sufficiently high value to obtain a signal which is for all practical purposes identical to the input. The synchronizer 70 is used so that when the glide slope signal from the ILS is lost momentarily such as when the ILS unit on the ground fails, the monitor 30 will have a vertical rate reference. For a period of time, which can be up to 5 seconds when the glide slope signal is lost, the "No G.S." switch 74 will be in the open state disconnecting beam deviation inputs to the synchronizer and the inertial rate ($\Delta \dot{H}_2$) is used in conjunction with a memorized (synchronized) rate reference from the integrator 70.

Beam rate ($\Delta \dot{H}_1$) with no inertial component is also generated. This signal is generated by passing the beam deviation signal $\Delta H_1$ which was previously described, through a filter 76. The corner frequency on filter 76 is such that over the frequency range of interest, it functions as a differentiator. This signal ($\Delta \dot{H}_1$) is used for beam tracking performance criteria where the aircraft position relative to the ILS beam instead of with respect to the runway is desired.

The basic displacement signal $\Delta H$ is obtained through the use of complimentary filtering between the beam deviation signal $\Delta H_1$ and the inertial rate signal ($\Delta \dot{H}_2$). The rate signal ($\Delta \dot{H}_2$) is approximately integrated through a first order lag 78. A synchronizer composed of integrator 80 and the associated feedback loop is used for the "No G.S." mode as part of the complimentary filtering. The synchronizer acts as a washout to the inertial reference signal ($\Delta \dot{H}_2$) and as a first order lag to the beam deviation signal $\Delta H_1$. In the "No G.S." mode, switch 82 opens, fixing the displacement reference $\Delta H_1$ which is added in summer 84 with the inertially generated position ($\Delta H_2$) to obtain the displacement signal $\Delta H$.

FIG. 2C shows in diagrammatic form the derivation of the lateral axis variables $\Delta Y$, $Y_1$, $\dot{Y}$, $\dot{Y}_1$ and $\ddot{Y}$. This derivation is the same as the longitudinal axis with the exception of the lateral inertial rate $\dot{Y}$ and acceleration $\ddot{Y}$. The earth reference acceleration $\ddot{Y}$ is obtained by combining in summer 88 the lateral acceleration $A_y$ of the aircraft with the aircraft bank angle $\phi$ converted to the proper units by converter 90. If the turn of the aircraft is coordinated, the aircraft lateral acceleration $A_y$ will be zero and the acceleration with respect to the earth will be proportional to the bank angle $\phi$. The constant of proportionality of the converter 90 is the acceleration of gravity G divided by a radian to degrees conversion factor. The lateral acceleration input supplies the necessary information to correct the calculation for non-coordinated turns. The sum of the lateral acceleration $A_y$ and the bank angle $\phi$ is passed through a washout filter 92 to remove any null offsets in either of the two signals $A_y$ and $\phi$. This earth reference acceleration signal $\ddot{Y}$ is processed through a first order lag 94 which approximates the operation of an integrator to obtain the inertial reference velocity term $\dot{Y}_2$. The remainder of the lateral variable derivation is identical to that of the longitudinal axis previously described in FIG. 2B.

Predictor Models

Figure 3:
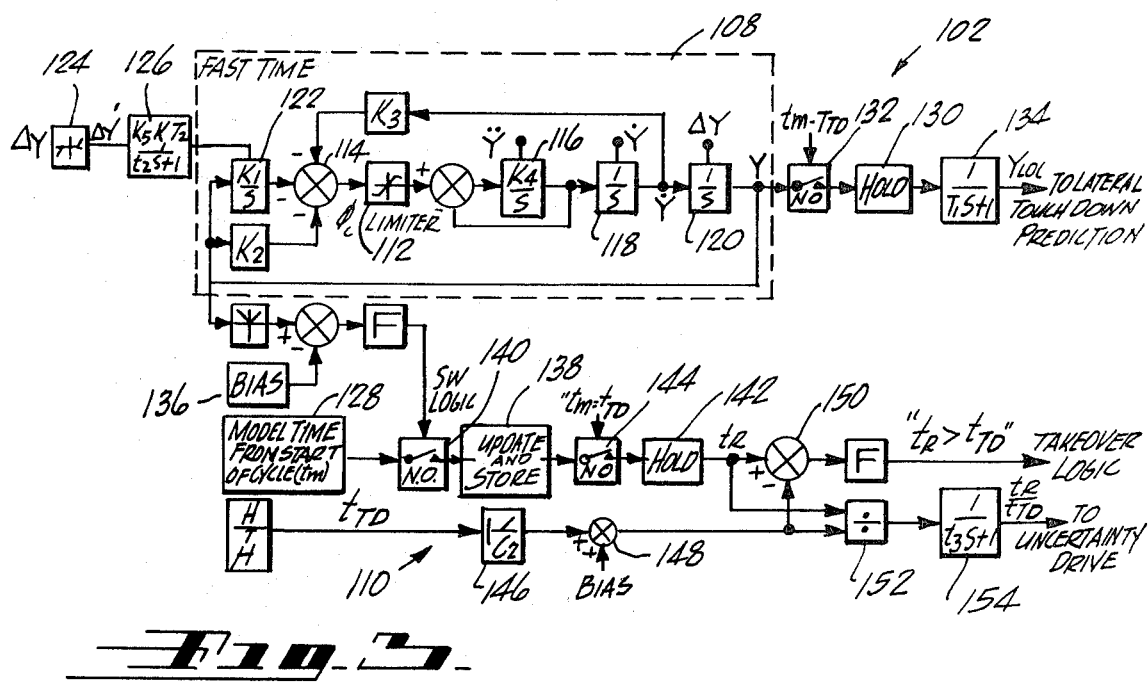
FIG. 3 is a diagram of a lateral predictor model.
Figure 4:
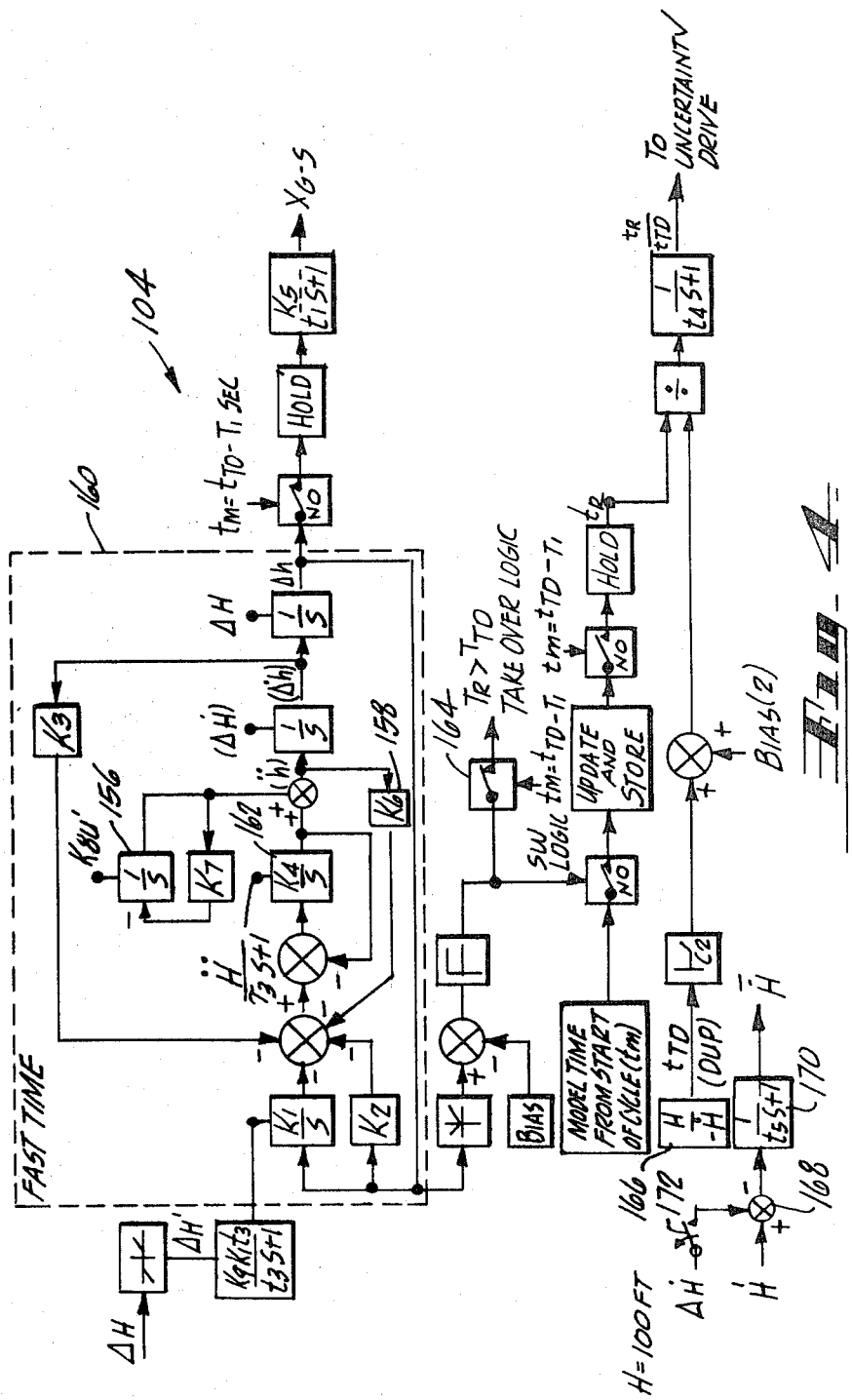
FIG. 4 is a diagram of a longitudinal predictor model.

The performance assessment means 34 predict the touchdown point based on the aircraft's state at the start of the prediction and include a lateral directional predictor model 102 shown in FIG. 3, a longitudinal predictor model 104 shown in FIG. 4, and a flare predictor model 106 shown in FIG. 5. Referring to FIG. 3, the portion 108 thereof enclosed by the dashed lines operates in fast-time while the remaining portion 110 operates in real time. The fast-time portion 108 of the lateral predictor model 102 is a fourth order differential equation. The equation is non-linear in that it incorporates a limiter 112 which limits the sum of rate $\dot{y}$, position y and position integral added in summer 114 to produce a command signal. This constraint of the limiter 112 represents the command limit of the aircraft automatic flight control system.

The basic method of solution is to obtain the command signal from the summer 114, limit this signal as need be in the limiter 112 and then pass the signal through integrator 116 with feedback to obtain acceleration $\ddot{y}$. The acceleration $\ddot{y}$ is integrated by integrator 118 to obtain rate $\dot{y}$, the rate $\dot{y}$ is integrated by integrator 120 to obtain the position y. The integral, position, and rate signals are summed using the gains K1, K2 and K3 respectively as shown to obtain the command signal $\phi_c$. Each of the integrators 116, 118, 120 and 122 is initialized at the start of every predictor solution. The initial condition (IC) of integrator 122 is the integral initial condition and is also used in the command model which will be discussed hereinafter. This input is obtained by passing the position input $\Delta Y$ through a dead band 124 and a first order lag 126. The input represents the approximate time integral of beam deviation. The function of the dead zone 124 is to remove or reduce any null offsets that might saturate the lag filter 126. The combination of a short time constant on the lag 126 which approximates the integral function, a large dead zone, and an IC gain K5 of less than unity provides sufficient modeling accuracy while minimizing the problem of null amplification. The ICs $\ddot{Y}$, $\dot{Y}$ and $\Delta Y$ for the integrators 116, 118 and 120 respectively are obtained directly from the parameter derivation of FIG. 2C as previously described.

At the start of each predictor run, a fast-time clock or counter 128 is initialized. This clock time $t_m$ is compared to the time to touchdown which is derived later to determine the stop time of the predictor. At the stop time the displacement signal y is passed to a hold circuit 130 by closing of a normally open switch 132 so that only the final value of the predictor 108 will be passed to a first order lag 134 for smoothing before being routed to the touchdown predictor display, to be discussed hereinafter.

The predictor also determines the recovery time $t_R$ for each fast time solution. Recovery time $t_R$ is defined as the time required for the predicted response to be within a certain threshold. Referring to FIG. 3 this threshold is defined by the value of y, bias 136 and threshold 137. An update and store 138 always contains the value of the last time $t_m$ at which the predicted displacement y is larger than the allowed threshold due to the action of switch 140., which is closed by the signal from the threshold 137. The value on the update and store 138 is passed to a hold circuit 142 by switch 144 which closes at the completion of each prediction run. The output of the hold circuit 142 is therefore the recovery time $t_R$.

The time to touchdown $t_{TD}$ is the predicted time for the aircraft to reach the ground and it is calculated by dividing the altitude H of the aircraft by the average altitude rate on the glidescope $\bar{H}$. The time of interest is the time that it will take the aircraft to reach the Category II window which is obtained by imposing a dead zone 146 on the time to touchdown signal $t_{TD}$. A constant is then added at summer 148 to avoid dividing by zero. If the recovery time $t_R$ is ever greater than the time to the window, the output of summer 150 becomes positive and the "takeover" logic is set. The uncertainty of the predictor 102 is obtained by dividing the time to recover $t_R$ by the time to the Category II window in a division circuit 152. This division is smoothed through a first order lag 154 to obtain the lateral predictor uncertainty signal $t_R/t_{TD}$.

If optional roll-out control means to be discussed hereinafter are included in the PAFAM 30, switch 144 will be opened at touchdown so no "takeover" can be generated by the predictor 102 during the roll-out of the aircraft.

The longitudinal predictor 104 shown in FIG. 4, is similar to the lateral directional predictor 102 with a slight increase in complexity due to a requirement to reflect the effects at airspeed. The combination of an integrator 156 associated with IC $K_8U'$ and an additional closure provided by $K_6$ feedback 158, represent the air-speed variation to the predictor 104. With the exception that the pitch axis does not need a command limiter like limiter 112, the fast-time longitudinal predictor 160 is identical to the fast-time lateral predictor 108. The $K_6$ feedback 158 provides the acceleration feedback signal ($\ddot{h}$) while integrator 162 and its feedback represents the command response transfer function. The initial condition for integrator 162 is obtained by filtering the acceleration output $\ddot{H}$ obtained as previously described.

Since the longitudinal predictor run is terminated at a predetermined altitude usually equivalent to 100 feet, the "takeover" logic is set directly by switch 164 from the recovery time deviation and does not have to be compensated to obtain the window criteria discussed in relation with the lateral predictor 102.

The time to touchdown $t_{TD}$ derivation is also described in FIG. 4. The time to touchdown $t_{TD}$ is obtained by dividing, in division circuit 166, the radio altimeter output H by the negative of average sink speed $\bar{H}$. Average sink speed $\bar{H}$ is obtained by passing the difference between sink speed relative to nominal $\Delta H$ and the total altitude rate $\dot{H}$ as combined in summer 168 through an averaging filter 170. Below an altitude of 100 feet the sink speed $\Delta \dot{H}$ relative to the ILS beam cannot be used since beam track is no longer maintained and therefor switch 172 is opened. The development of the predictor uncertainty for the longitudinal axis is the same as that described for the lateral axis above.

The third fast time predictor is the flare predictor 106 shown in FIG. 5. The fast-time portion 174 of flare predictor 106 is a simulation of a third order, non-linear differential equation. The fast-time flare predictor 174 starts operation at an aircraft altitude of 100 feet, however, the switch 176 in the forward loop prevents any closed loop response until the signal $V_1$, which is $K_2h$, $K_1h$, and a nominal $\dot{H}_{TD}$ bias combined by summer 178, becomes positive. This is equivalent to an aircraft pitch-up command. Once the switch 176 closes it does not reopen until the predictor run is complete. If $V_1$ is positive at the start of the predictor run, the switch 176 closes and remains closed for all subsequent predictor runs.

The fast-time flare predictor model solutions for altitude $h$, altitude rate $\dot{h}$, and altitude acceleration $\ddot{h}$ are obtained using an exponential flare law. $K_1$, the gain in the altitude $h$ feedback loop 180, $K_2$, the gain in the altitude rate $\dot{h}$ feedback loop 182 and the bias added by summer 184 represents an implementation of the flare control law. The integrator 186 and its feedback loop for altitude acceleration represents the aircraft lag. Integrators 186, 188 and 190 of the predictor 174, respectively, produce altitude acceleration $\ddot{h}$, altitude rate $\dot{h}$ and altitude $h$ signals. The initial condition for integrator 188 is the sink speed $\dot{H}_{FL}$ that was obtained from the combination of the radio altimeter signal $H_{RA}$ and the normal accelerometer signal $A_n$ in FIG. 2A, the initial condition for integrator 190 is the radio altitude $H_{RA}$ and the initial condition for integrator 186 is the lagged acceleration that is used in the longitudinal predictor as the initial condition of integrator 162 (FIG. 4).

The output of the flare fast-time predictor 174 is not the displacement of the aircraft at a particular time but the length of time required for the predictor 174 to obtain a zero altitude. This time in conjunction with the aircraft ground velocity is used to obtain the predicted touchdown point.

The aircraft ground velocity $\nu$ is obtained by combining the airspeed signal, CAS, from the air data computer in the aircraft with the sum of derived total sink speed and the sink speed relative to the beam. Assuming that the aircraft is flying an average glide slope elevation angle, the ground speed is the negative of 20.9 multiplied by the sink speed. The 20.9 factor is the recipical of the tangent of the average glide slope elevational angle of 2.75 degrees. Two thirds of this ground speed signal $-20.9(\dot{H}-\Delta\dot{H})$, is combined in summer 192 with one-third of the airspeed signal, CAS, to yield the best approximation for the true ground speed $\nu$. Below an altitude of 100 feet the aircraft flare maneuver will be initiated. After flare the aircraft will no longer be in the region where the glide slope signal from the ILS is intelligible so the altitude rate to ground velocity conversion discussed above, is no longer useable. Therefore, the only speed signal below this altitude consists of airspeed synchronized to the value of the $\nu$ that existed when switch 194 was opened at 100 feet. The memorized reference as supplied thereafter by storage means 196 is required to minimize error due to the possible presence of longitudinal winds.

The distance $X_{100\,ft.}$ traveled from an altitude of 100 feet to touchdown is obtained by integrating the derived ground speed $\nu$ in integrator 198. This distance, $X_{100\,ft.}$, is added in summer 200 to the product of the ground speed $\nu$ and the flare time signal $t_m$ at $h=o$ filtered by filter 202 to obtain the variation of the predicted touchdown point during the flare maneuver. This prediction should remain constant. To obtain the touchdown point relative to the nominal, a constant bias is subtracted from the derived distance in summer 204 to obtain the perturbed distance $\Delta x$. The final flare touchdown point, $X_{FL}$, is obtained by adding in summer 206 the perturbed distance $\Delta x$ to a signal which represents the distance that the aircraft will land long if the aircraft throttles are not retarded. This signal is zero unless the "no retard" logic is set.

The uncertainty signal $\Delta \dot{x}$ associated with the flare prediction is generated by differentiating the predicted touchdown distance $\Delta x$ in a high pass filter 208. For the nominal run, the predicted touchdown point will remain a constant. Therefore, the derivative $\Delta \dot{x}$ will be zero. When a system is perturbed the predicted touchdown point $\Delta x$ will be varying and there will be an uncertainty associated with the prediction. If the absolute value of flare uncertainty signal $\Delta \dot{x}$ becomes greater than a predicted predetermined value, the degraded performance logic will be set by a signal passed thereto by block 210.

If the predicted touchdown point $\Delta x$ becomes larger or smaller than the acceptable values, the "takeover" logic will be set by a signal passed thereto by block 212. The acceptable values ($c_1$ and $c_3$) of the predicted touchdown point $\Delta x$ are not equal since it is more acceptable to land long than it is to land short. The "takeover" logic will also be set if the final value of the predicted sink speed $\dot{h}_{TD}$ is more negative than a predetermined value shown as 8 feet per second in block 214. The "takeover" logic will also be set if the PAFAM flare logic is set to the "no flare" state. This setting will be discussed hereinafter.

If the rollout option discussed above is included in the PAFAM 30, switch 175 is opened to deactivate the output of the flare predictor 174. However, the operation of the distance integrator 198 is still maintained so that the distance measurement $x$ is reliable and can be used in the runway display computation.

Command Models

Figure 6:
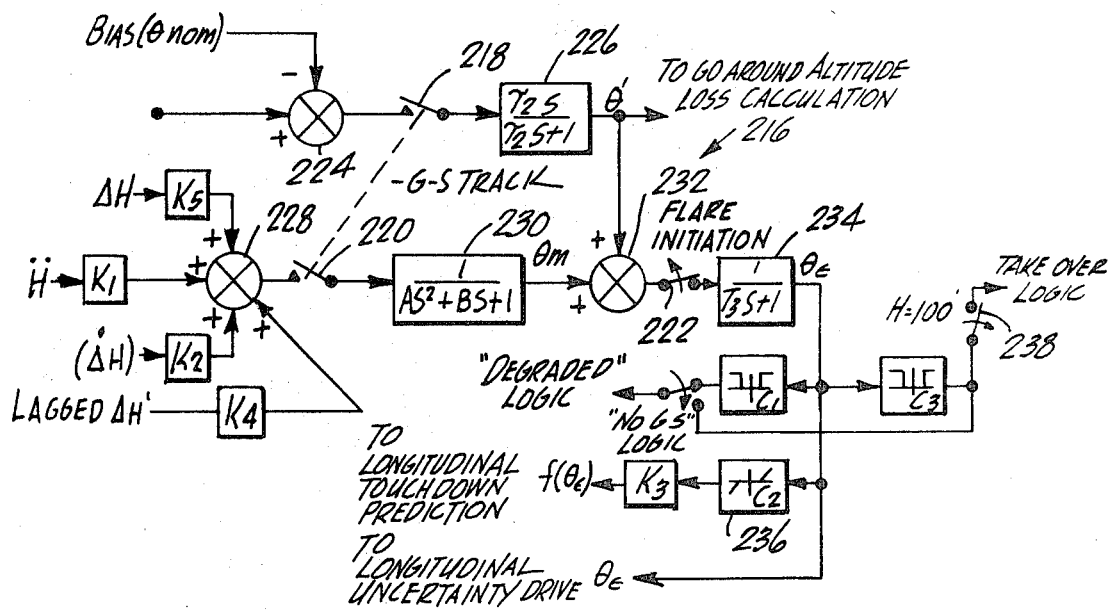
FIG. 6 is a diagram of a pitch command model.

Command models are used to determine how well the aircraft/autopilot combination is following the command control law. One of these command models, the pitch command model 216 is shown in FIG. 6. The basic concept is to determine the pitch angle variation from nominal and compare this to a commanded pitch angle. This pitch angle is computed on the basis of the variables displacement $\Delta H$, rate $\Delta \dot{H}$, acceleration $\ddot{H}$, and integral lagged $\Delta H'$. The pitch command model 216 is initiated by ganged switches 218 and 220 which close at glide slope track as determined by the autopilot, and terminated when the flare mode is initiated at 100 feet and switch 222 opens.

In the pitch command model 216, the perturbed pitch angle $\theta'$ is obtained by differencing the vertical gyro output $\theta$ with a constant $\theta$ nom in summer 224 and passing the sum through a washout filter 226. The commanded pitch angle is then calculated by adding the input signals $\Delta H$, $\Delta \dot{H}$, $\ddot{H}$, and lagged $\Delta H'$ in summer 228 through the appropriate gains $K_1$, $K_2$, $K_4$ and $K_5$, as shown. This commanded pitch angle is passed through a second order filter 230 which represents the approximate aircraft response to the commanded pitch angle to obtain the pitch model signal $\theta_m$. This signal, $\theta_m$, is added to the perturbed pitch angle $\theta'$ in summer 232 and passed through a smoothing filter 234 to obtain the pitch error output signal $\theta_\epsilon$.

The pitch error output signal $\theta_\epsilon$ is used in the longitudinal uncertainty calculation. The error signal $\theta_\epsilon$ is also passed through a dead zone 236 and gain K3 for use in the longitudinal touchdown prediction. The signal $\theta_\epsilon$ therefore, does not influence the longitudinal touchdown prediction until it is greater than the predetermined value represented by the dead zone 236. The error signal $\theta_\epsilon$ is also used to set the "degraded" and "takeover" logic signals. If the error signal $\theta_\epsilon$ is greater than a set value (C1) the "degraded" logic is set. If the error signal $\theta_\epsilon$, on the other hand, is greater than C3, which is greater than C1, then the "takeover" logic will be set if the aircraft is above the predetermined switchover altitude which as aforesaid is arbitrarily chosen at 100 feet at which time switch 238 is opened. Below 100 feet the pitch command model 216 cannot generate a "takeover" condition because of the open condition of switch 238. When the "No G.S." logic is set, switch 240 is moved as shown in FIG. 6 so that the "degraded" logic threshold is increased to be identical with that of the "takeover" logic threshold.

Figure 7:
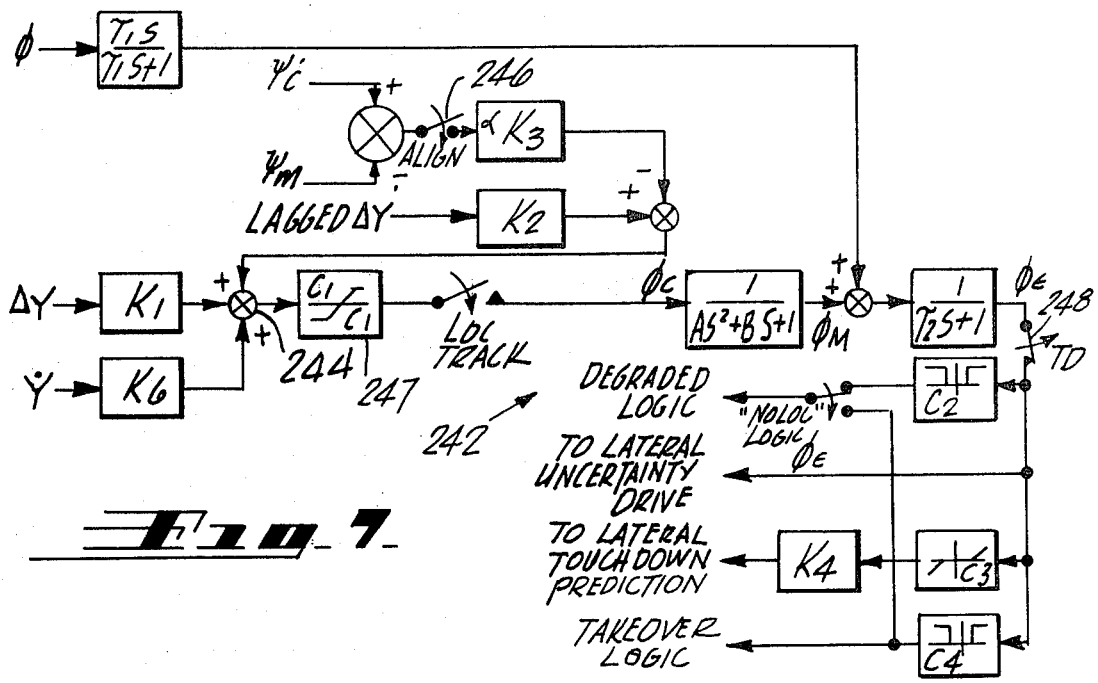
FIG. 7 is a diagram of a roll command model.

The function of the roll command model 242, as shown in FIG. 7, is basically the same as that of the pitch command model 216. The perturbed roll angle $\phi'$ is attained in the same manner as the perturbed pitch angle, however, a nominal bias is not needed since the nominal roll angle is zero. The commanded roll angle $\phi c$ is obtained by adding in summer 244 displacement $\Delta Y$, rate $\dot{Y}$, integral lagged $\Delta Y'$, and when the align mode is engaged and switch 246 is therefore closed, a heading term $\psi_f - \psi_m$. The heading term $\psi_f - \psi_m$ is required to compensate the model 242 for the natural wing down condition when a forward slip maneuver is in progress. In this maneuver, the aircraft in a steady cross-wind condition, flies a course angle equal to the runway heading and a roll angle $\phi$ sufficient to fly a zero localizer deviation path. Normal aircraft behavior before the align maneuver is to track with zero roll angle $\phi$ and sufficient heading angle to maintain the ground track. The command generated by summer 244 is limited to C1 by limiter 247 to obtain the final roll command signal $\phi c$. The remainder of the roll command model 242 is similar to that of the pitch command model 216 and performs approximately the same function except that switch 248, which opens on aircraft touchdown, is included to disable the roll command model 242 during the rollout mode when the optional rollout means are included in the PAFAM 30.

The align model 260, as shown in FIGS. 8A and 8B, is used to determine if the heading of the aircraft is being controlled in a reasonable manner during the align mode. The monitor align logic is set if both autopilot channels 262 and 264 have indicated an aligned condition or the radio altimeter signal $H_{RA}$ indicates an altitude below that altitude set by a Bias, as calculated in summer 266.

The align model 260 is started when the align mode of the autopilot is initiated and operates in real time to simulate the heading error decay characteristics associated with a proper align maneuver. The final integrator 268 is initialized with the heading error signal $\psi_i$, that is, the aircraft heading minus the runway heading $\Delta\psi$, at align initiate. The output $\psi_m$ of integrator 268 decays to zero as a function of time. The output error signal $\psi_\epsilon$ is obtained by differencing the model heading signal $\psi_m$ with the aircraft heading error signal $\Delta\psi$ in summer 270, as shown. This output signal $\psi_\epsilon$ is used in the uncertainty generation. The error signal $\psi_\epsilon$ is also used to set the "degraded" and "takeover" logic signals. The threshold for the "degraded" logic, C1, is smaller than the "takeover" logic threshold, C2, as shown.

The model heading rate $\dot{\psi}_m$ is accessable for use in the sensor validation logic. Also accessable are the heading signals $\psi_i$ and $\psi_m$ required by the roll command model 242. The difference of $\psi_i$ and the model heading $\psi_m$ will initially be zero and will build up to a total heading change required during the align mode. This heading change is directly proportional to the amount of roll angle $\phi$ required to fly the forward slip maneuver, as aforesaid.

A switch 272 is included in the align model 260 when the rollout option is included in the PAFAM 30. At touchdown switch 272 opens so the align model 260 cannot set the "degraded" or "takeover" logic during the rollout mode.

Performance Index

The performance assessment functions and the signals generated therein described in conjunction with FIGS. 2 through 8 indicate the future conditions and the acceptability of the aircraft/autopilot response. As such, these signals do not cause any change in output to the display means 44 as a result of turbulence, windshear, or ILS beam bends unless the predicted terminal conditions are effected thereby. Two other signals are therefore generated to reflect external disturbances in the control signals sent to the display means 44 for the purpose of providing visual correlation of the disturbances with other stimuli to the pilot such as that from his flight instruments. These signals are the localizer and glide slope performance indices, $L_\epsilon$ and $G_\epsilon$, the derivation of which are shown in FIGS. 9 and 10 respectively. The localizer performance index $L_\epsilon$ is generated by properly weighting the variables Y, $\dot{Y}_1$, and $\ddot{Y}$ generated in FIG. 2C by gains $K_8$, $K_9$ and $K_4$, respectively. The weighted variables are then added in summer 274 and passed through an averaging filter 276 to obtain the index $L_\epsilon$. When an upset first occurs, due to turbulence, windshear or ILS beam bends, all three signals, Y, $\dot{Y}_1$, and $\ddot{Y}$ are additive and the resultant signal is large. However, during the recovery, the rate $\dot{Y}_1$ and acceleration $\ddot{Y}$ terms, effectively cancel the position error $Y_1$ resulting in a small signal amplitude. Note that the rate and position information are derived solely from the beam information so that the indices are influenced by beam bends as well as by winds. This is also true of the glide slope performance index $G_\epsilon$ which is generated in a like manner from the $\Delta H_1$, $(\Delta\dot{H}_1)$ and $A_n$ signals, the first two of which are generated in FIG. 2B.

Short Period Models

The two major modes of control of an aircraft are the navigational modes which are long term in nature and the stabilization modes which are short term in nature. The navigational modes are monitored by the command models and the stabilization modes are monitored by the short period models.

Figure 11:
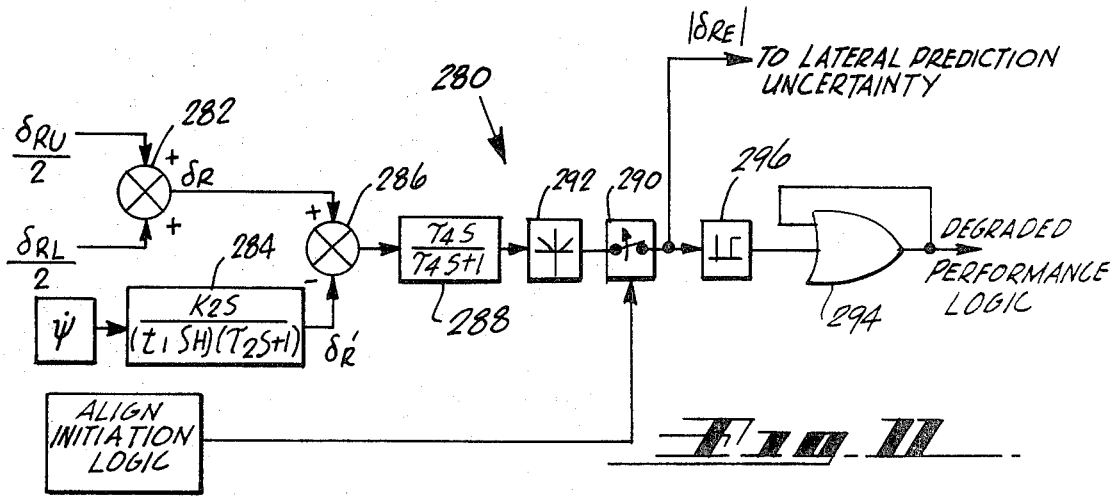
FIG. 11 is a diagram of a short period yaw model.

The short period yaw model 280 is shown in FIG. 11. This model monitors the yaw damper closure. On aircraft having upper and lower rudders, the upper and lower rudder signals, $\delta_{RU}$ and $\delta_{RL}$, are added in summer 282 with a gain of one-half to obtain the effective rudder signal $\delta_R$. The yaw rate signal $\dot{\psi}$ from the rate gyro is passed through a band pass filter 284 to obtain the equivalent rudder command $\delta_R'$. If the yaw rate signal $\dot{\psi}$ is causing the rudder movement, the two signals $\delta_R$ and $\delta_R'$ will be of opposite polarity and will add in summer 286 yielding a large output. The output signal from summer 286 is passed through a high pass filter 288 which eliminates any steady signals or navigational commands in the error signal $\delta_{R\epsilon}$. The short period yaw model operation is terminated by switch 290 which opens when the align mode is initiated. Also before the error signal $\delta_{R\epsilon}$ is used in the lateral prediction uncertainty calculation, the absolute value of the error is obtained by passing the output of the filter 288 through the block 292 whose characteristics are shown.

The "degraded" logic is set whenever the error signal $|\delta_{R\epsilon}|$ gets larger than a predetermined value as determined by threshold 296. Once the short period yaw model 280 has generated a degraded condition, the "degraded" logic is latched so that even though the error signal $|\delta_{R\epsilon}|$ later becomes less than the threshold value required to indicate a "degraded" logic condition, the "degraded" signal is still maintained.

Figure 12:
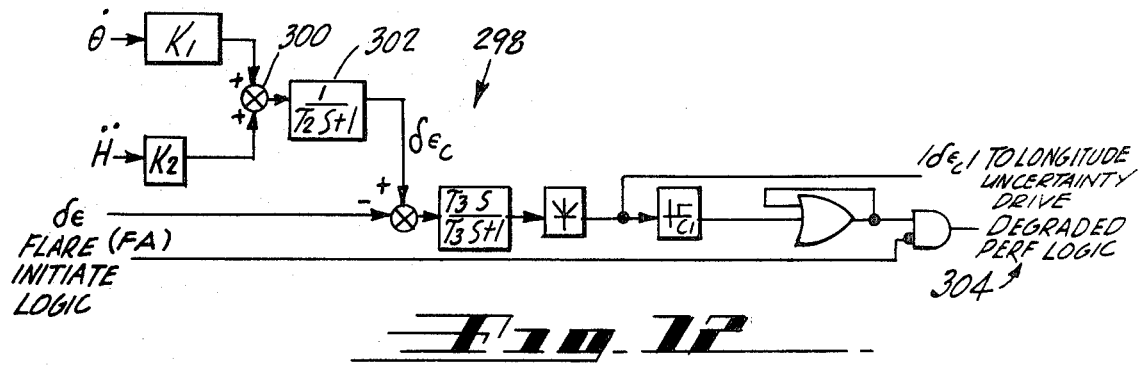
FIG. 12 is a diagram of a short period pitch response model.

In the glide slope track mode the basic stabilization closure of the autopilot in the longitudinal axis is pitch rate and normal acceleration. Therefore, the short period pitch model 298 as shown in FIG. 12 uses pitch rate $\dot{\theta}$ and altitude acceleration $\ddot{H}$ as the input signals thereto. The pitch rate signal $\dot{\theta}$ is a derived pitch rate. This signal is derived in the altitude loss calculation discussed hereinafter. The acceleration signal $\ddot{H}$, on the other hand, was derived as one of the state variables in the circuit of FIG. 2B. The rate and acceleration signals, $\dot{\theta}$ and $\ddot{H}$ are gained by $K_1$ and $K_2$, respectively and added in summer 300 before passing through a first order lag approximation 302 of an elevator actuator. The output of the lag 302 is the effective elevator command $\Delta e_c$. The aircraft elevator signal used is the effective total elevator signal $\Delta e$ which will be derived hereinafter. The derivation of the longitudinal uncertainty signal $|\delta_{r\epsilon}|$ is thereafter similar to the way the uncertainty signal $\delta_{R\epsilon}$ was derived in the short period yaw model 280. The "degraded" performance logic 304 is also the same with the exception that the short period pitch model's logic is always set to false when the flare is initiated by a signal sent thereto by the flare initiate logic of the autopilot.

Figure 13:
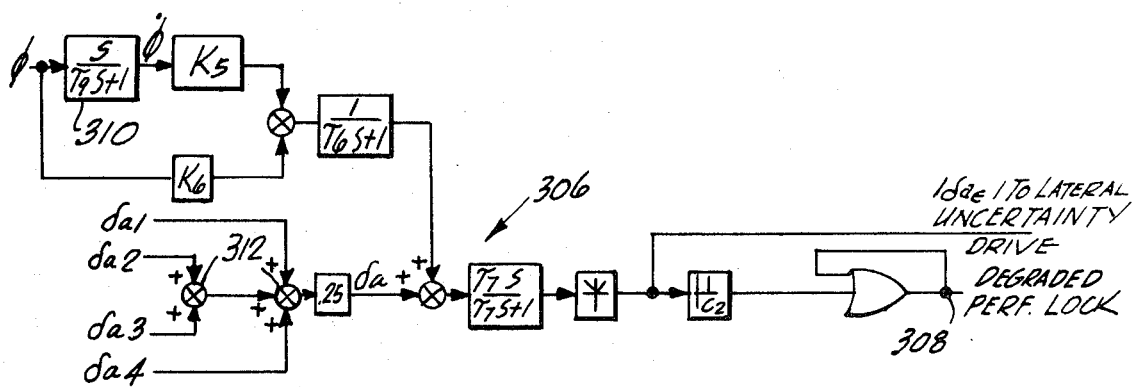
FIG. 13 is a diagram of a short period roll response model.

The short period roll model 306 as shown in FIG. 13 is similar to the short period pitch model 298 except that the degraded logic 308 thereof is never reset and the derivation of roll rate $\dot{\phi}$ and the effective aileron signals $\delta a$ are shown. To derive roll rate $\dot{\phi}$ the output of the roll gyro signal $\phi$ is passed through a high frequency filter 310. This filter 310 looks like a differentiator for all frequencies below the corner frequency therein. For frequencies of interest the roll variation is below this corner frequency. The aileron signal $\delta$ is obtained by adding the individual surface signals in summers 312 which in the case shown, is for $\delta a1$, $\delta a2$, $\delta a3$, and $\delta a4$ taking one-fourth of the sum to obtain the effective aileron signal $\delta a$.

Uncertainty Derivation

The uncertainties generated by the individual models are combined to form uncertainty signals for display on the display means 44. The lateral uncertainty signals both to the right and to the left are generated respectively by means 314 and 316 shown in FIG. 14. Referring to the right uncertainty signal generation means 314, there are two basic paths for uncertainties, the first being a limited path 318 and the second unlimited paths 320. The paths 318 and 320 are joined in a maximum value selector 322. The inputs to the limited path 318 are the recovery time ratio, $t_R/t_{TD}$, from the lateral directional predictor model 102, the roll error signal $\phi_\epsilon$ from the roll command model 242 and the localizer performance index $L_\epsilon$. The positive portions of the uncertainty signals, $\phi_\epsilon$ and $L_\epsilon$, are scaled to the proper units by $K_8$ and $K_3$ respectively and added in summer 324 with the scaled recovery time ratio $K_2 t_R/t_{TD}$, which is always positive. This summed signal is then modified by a gain program 326. As the aircraft approaches the runway altitude, this portion of the uncertainty signal is reduced by the gain program 356. This reduced output is summed in summer 328 with a bias representing the minimum uncertainty allowed. The signal is then limited by limiter 330 and fed to the maximum value selector 322. Thus, the roll command model 242 and the performance index have limited authority in the uncertainty calculation. The total right uncertainty signal before touchdown is obtained by picking the maximum value of five signals which are scaled outputs $|\delta a_\epsilon|$ of the short period roll model 306, the positive value of the output $\phi_\epsilon$ of the align model 260, $\delta R_\epsilon$ of the short period yaw model 280, the recovery time ratio $t_R/t_{TD}$ from the lateral-directional predictor model 102 and the limited path output as aforesaid. The right uncertainty signal after touchdown is obtained from the rollout model to be discussed hereinafter if that option is included.

The left uncertainty is obtained similarly except the negative portion of each signal is used and the maximum value selector becomes a minimum value selector 332. If the recovery time ratio $t_R/t_{TD}$, short period roll $\delta a_\epsilon$ and the short period yaw $\delta R_\epsilon$ have no negative value then the positive values thereof are inverted, that is, made negative, and used. These three signals then affect the right and left uncertainty signals equally.

Figure 14:
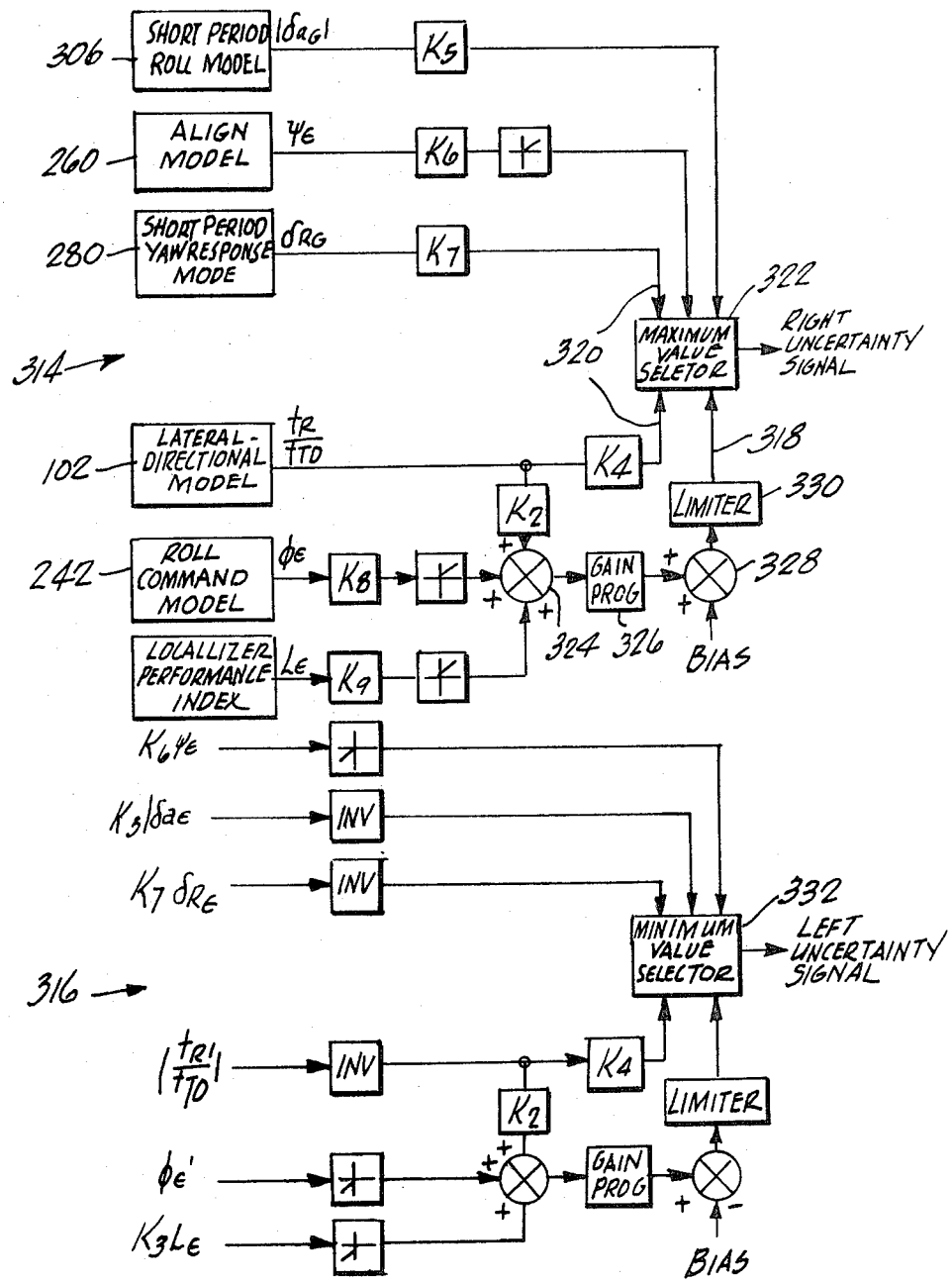
FIG. 14 is a diagram of lateral prediction uncertainty computation means.

The long and short uncertainty signals are generated by the long and short longitudinal prediction uncertainty means 340 and 342 as shown in FIG. 15 which are similar to the lateral uncertainty means 314 and 316 shown in FIG. 14. The only difference between the two types of circuits other than the change from lateral inputs to longitudinal inputs is the 100 foot altitude switches 344 and 345. At an altitude of 100 feet the switches 344 change from the position shown in FIG. 15 to their alternate positions removing the glide slope track uncertainty signals $|\delta e_\epsilon|$, $t_R/t_{TD}$, $\theta_\epsilon$ and $G_\epsilon$ and replacing them with the flare uncertainty signals ($\Delta \dot{X}$). The blocks 346 and 348 are exponential decay circuits. Before the switches 344 change their position, the outputs of the blocks 346 and 348 follow the uncertainty signals whereas after the switches 344 change position, the outputs of the blocks 346 and 348 exponentially decay to zero. At the 100 foot altitude, a step input equal to the minimum uncertainty signal is introduced to first order lags 350 and 352 by the switches 345. The time constant of these lags are identical to the time constant of the exponential decay circuits 346 and 348. When the two signals are summed together by summers 354 and 356 respectively, the effective result is the exponential decay of the existing long and short uncertainty signals to values equal to the minimum uncertainty. To these signals are summed in summers 354 and 356 the output ($\Delta \dot{X}$) of the flare uncertainty predictor model 106 discussed before. For the long uncertainty, the positive portion of ($\Delta \dot{X}$) is used and for the short uncertainty, the negative portion thereof is used.

The switch 358 labeled "TD + 3 sec" which is opened three seconds after touchdown, is included if the rollout option is included in the PAFAM 30. This switch 358 removes uncertainty flare certainty signal ($\Delta \dot{X}$) and supplies a signal K to display a constant on the display means 44.

Touchdown Derivation

Figure 16A:
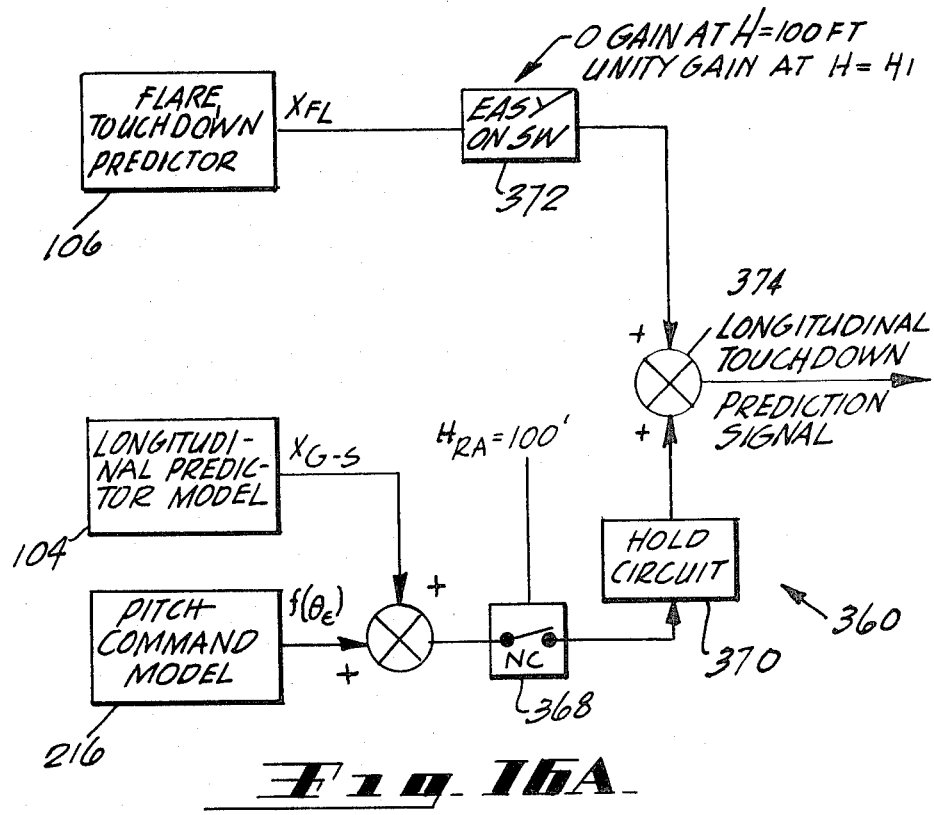
FIGS. 16A and 16B are a diagram of touchdown prediction computation means.
Figure 16B:
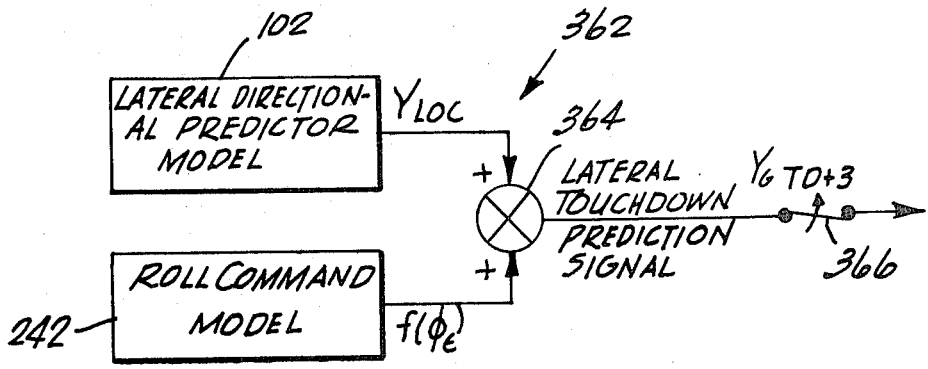

The derivation of the touchdown prediction is shown in block diagram form in FIGS. 16A and 16B. This derivation is mostly assembling outputs that have already been calculated. The top portion of the figure shows the longitudinal touchdown derivation portion 360 and the lower shows the lateral touchdown derivation portion 362. The predicted lateral touchdown point is obtained by summing in summer 364 the output $Y_{loc}$ of the lateral predictor 102 with a nonlinear output $f(\phi_\epsilon)$ from the roll command model 242. If the roll command model output error is below the dead zone, as shown in FIG. 7, the lateral predictor output is used exclusively for the calculation of the touchdown point. If, on the other hand, the roll command model output $f(\phi_\epsilon)$ has an error greater than the dead zone, the predicted touchdown point will be moved. The inference is that the aircraft is not following the control law response implemented by the predictor 362; and therefore, the predicted point from the predictor 362 is modified to provide an indication in advance of a "takeover" condition to anticipate the normal prediction.

The switch 366 labeled "TD + 3 sec" is included as shown if the rollout option is included in the PAFAM 30. It is used to remove the previously described touchdown calculation at touchdown plus 3 seconds and thereafter the rollout prediction is used. This rollout prediction calculation will be described hereinafter.

The longitudinal touchdown prediction from predictor 360 is obtained in a like manner when the aircraft is above 100 feet. When the aircraft passes through the altitude of 100 feet, however, a switch 368 on the input to hold circuit 370 opens, maintaining the touchdown point calculated from $X_{G-S}$ and $f(\theta_e)$ as a constant. This provides a reference for the touchdown prediction when the aircraft flares. At an altitude approximately equal to 60 feet the aircraft will go into a flare maneuver. At this point the distance traveled will be a function of the flare law and the environment and will be independent of the aircraft position relative to the glide slope. The autopilot flare law does not change if the aircraft flares early or late since the aircraft flare law is a function of altitude and altitude rate only.

At an altitude of 100 feet the flare predictor 106 is activated. The output $X_{FL}$ of the flare predictor 106 is phased into the touchdown prediction by means of an easy-on switch 372. The easy-on switch 372 has a gain of zero for altitudes greater than 100 feet and from an altitude of 100 feet to an altitude of $H_1$ (60 feet) the gain is increased until the gain is unity at the $H_2$ altitude and is then held constant. The flare signal $X_{FL}$ so modified is added to the signal from the hold circuit 370 in summer 374 to obtain the touchdown prediction displayed to the pilot on the display means 44.

Go-Around Altitude Loss

In addition to the uncertainty and predicted touchdown points, the PAFAM 30 also assesses other portions of the aircraft performance. One of these other functions is the calculation of the amount of altitude that the aircraft would lose if a normal go-around were initiated. This information is used as a final warning that the pilot must take action when the "NO TRACK" criteria has been met; the "NO TRACK" criteria being that the aircraft is below an altitude of 600 feet, descending, and that the autopilot is not in the ILS track mode. The go-around altitude loss calculation is also used to determine the instruction to give the pilot in terms of whether he is to land or to go-around for the "TAKEOVER" mode. This will be discussed in more detail hereinafter.

The altitude loss number is generated by operating upon four variables. The variables used are the perturbed variables airspeed $u'$, angle of attack $\alpha'$, pitch angle $\theta'$, and pitch rate $\dot{\theta}$. The derivations of the perturbed variables $u'$, $\alpha'$ and $\dot{\theta}$ are shown on FIG. 17 whereas the perturbed pitch angle $\theta'$ was obtained in the pitch command model, FIG. 6, and the derivation is shown there. Once these variables are obtained, it is only a matrix multiplication problem to derive the altitude loss $-\Delta h'$. This multiplication matrix is:

$$\begin{bmatrix} K_1 & K_2 & K_3 & K_4 & K_5 \\ 0 & K_6 & K_7 & K_8 & K_9 \\ 0 & 0 & K_{10} & K_{11} & K_{12} \\ 0 & 0 & 0 & K_{13} & K_{14} \\ 0 & 0 & 0 & 0 & K_{15} \end{bmatrix} \begin{bmatrix} u' \\ \alpha' \\ \theta' \\ \dot{\theta} \\ 1 \end{bmatrix} = -\Delta h'$$

The matrix of "K's" is a table of constants calculated to yield the right altitude loss. $K_{15}$ is the nominal altitude loss when the perturbed variables are zero.

Performance Logic

Figure 18:
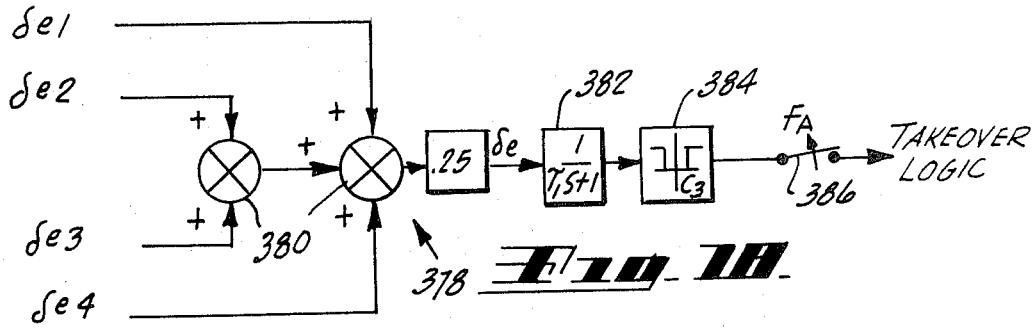
FIG. 18 is a diagram of elevator logic.

Another side calculation is a check to determine if there is sufficient elevator authority to perform the aircraft flare maneuver. The logic 378 for this is shown in FIG. 18. The positions of the elevator surfaces, which in this case are four, $\Delta e1$, $\Delta e2$, $\Delta e3$, and $\Delta e4$ are added in summers 380 and multiplied by .25 to find the effective elevator position $\Delta e$. This is the elevator position signal $\Delta e$ that was used by the short period pitch model 298 heretofore. This signal $\Delta e$, is then smoothed by filter 382 and checked against the acceptable threshold 384. If the signal is too large the "takeover logic" is set unless the flare maneuver has already been initiated which opens switch 386 thereby disconnecting the logic 378.

The remaining major function of the performance assessment means 34 is to determine the flare and retard logic signals. The monitor 390 for determining the flare and retard logic signals is shown in FIG. 19.

$H_{RA}$, $H_R$ and Bias (1) are summed by summer 392 to formulate an exponential flare law signal. Whenever this flare law signal is more negative than a threshold 394, the flare law logic is set to indicate that the flare should have occurred. To determine if the flare maneuver has begun the elevator movement $\Delta e$ is assessed. The elevator movement signal is filtered by filter 396 which is a long period washout filter used to remove any steady state signals which occur due to offsets of the elevator. If the elevator movement $\Delta e$ is greater than a predetermined value as determined by threshold 398 and either of the autopilot's flare logics are set causing an output from OR gate 400, the PAFAM flare logic 402 is also set. Once this logic 402 has been tripped it is latched by the OR gate 404 with feedback so that as the elevator moves back to the center, the information that the flare has occurred is retained. The monitor 390 also checks the altimeter output $H_{RA}$ and compares it against a constant, Bias (2), by means of summer 406 and threshold 408 to assure that the flare mode logic is not set at too low an altitude.

The flare initiate logic is obtained by combining through an OR gate 410, the minimum altitude signal and the output of an AND gate 412 which combines the logic from each autopilot channel. If the aircraft is below a fixed altitude or the flare logic from the autopilot channel 1 and the flare logic from the autopilot channel 2 are both present, the monitor flare is initiated.

Figure 19:
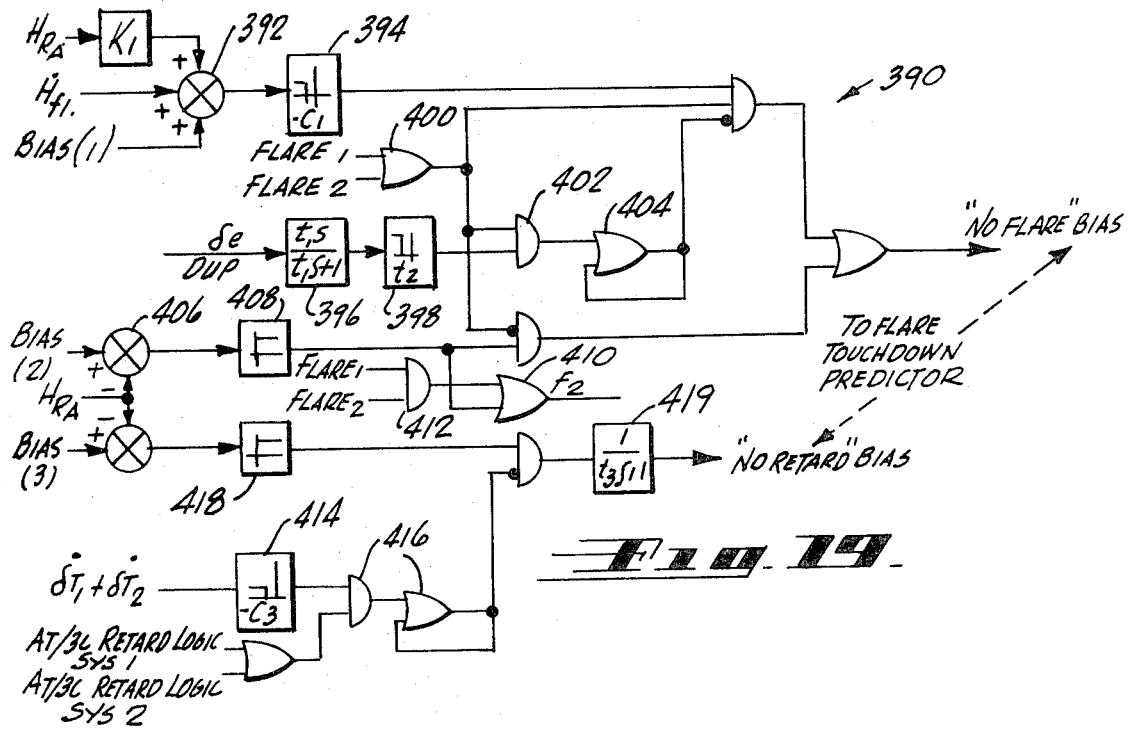
FIG. 19 is a diagram of a flare and retard initiation monitor.

The "NO FLARE" bias output is obtained by combining the various outputs already developed, as shown in FIG. 19. "NO FLARE" is set if the minimum altitude is reached and neither autopilot flare has been set or the flare law logic is set and either autopilot has been set and the elevator movement has not been set.

The "NO RETARD" bias is obtained in a similar but simpler manner. The two speed command throttle rate signals $\delta T_1$ and $\delta T_2$ are added and compared against a value representing twice the minimum retard rate in threshold 414. If this signal is present and either speed command retard logic has been set, the retard logic 416 is set. If the altimeter $H_{RA}$ reads an altitude less than some minimum retard altitude as established by Bias (3) and threshold 418 and the retard logic 416 has not been set, then the "NO RETARD" bias is set. The "NO RETARD" is a continuous type signal instead of a discrete signal so the output logic is passed through a first order lag 419 to smooth the step signal.

Rollout Monitor

As aforesaid, the PAFAM 30 can include a rollout option which allows monitoring of the aircraft during the landing roll until the aircraft is stopped on the runway. The aircraft performance during ground rollout consists of two distinct operations, steering and braking. The rollout steering assessment computations are performed by a rollout steering monitor 420, shown in FIGS. 20A and 20B, to provide outputs to drive the display means 44 which are switched to a different mode after touchdown and also to generate the "degraded" performance and "takeover" logic signals. The braking computations are performed by a braking monitor 422, shown in FIG. 21, to provide a distance readout for the display means 44 and to determine a feature of the distance readout, such as color, to indicate normal or abnormal behavior of the braking system of the aircraft such as if the average acceleration drops to a level indicative of near zero breaking.

A third order model 424 is used as part of the rollout steering monitor 420 to represent the steering function dynamics in simplified form. It is initialized with ground lateral position $Y_o$, rate $\dot{Y}_o$, and acceleration $\ddot{Y}$ as shown in FIG. 20A. This model 424 is operated in an accelerated time scale to predict the subsequent ground track of the aircraft up to a point where the model lateral rate $\dot{y}$ approaches zero. The value of the model displacement $y$ when the model rate $\dot{y}$ is zero is transmitted to hold means 426 by switch 428 which closes when the rate $\dot{y}$ is zero. The hold means 426 supply the model displacement $y$ to a threshold 430 which triggers "takeover" logic which the displacement $y$ is such as to indicate that the airplane might leave the runway.

Real time signal processing means 432 are also incorporated into the rollout steering monitor 420 to generate actual lateral position $Y_g$ and rate $\dot{Y}_g$ signals based upon a combination of lateral acceleration $\ddot{Y}$ and heading change $\Delta\psi$. The lateral acceleration $\ddot{Y}$ and heading change $\Delta\psi$ signals are added in summer 434 whose output is filtered in filter 436 and synchronized to the state variable $\dot{Y}$ by summer 438 and switch 440. Switch 440 opens to remove the state variable $\dot{Y}$ at the start of the rollout computations, which is touchdown plus three seconds. The output of summer 438 is the lateral rate $\dot{Y}_g$ of the aircraft on the ground. The lateral rate $\dot{Y}_g$ is passed to an integrator 442 by switch 444 which closes at touchdown plus 3 seconds. The output of the integrator 442 is synchronized to the state variable $\Delta y$ by summer 446 and switch 448 which like switch 440 opens at the start of the rollout computations. The output of summer 446 is the lateral position of the aircraft on the runway $Y_g$ which is passed to the display means 44. The lateral position $Y_g$ is also differenced with the model lateral position $y$ in summer 450 and then fed through separators 452 and 453 to derive the left and right uncertainty signals for the display means 44.

Using this type of circuit and data assures that the PAFAM assessment of lateral ground guidance is independent of the ILS localizer orientation along the runway although proper orientation at the approach end is assumed. However, the method of calculation shown in the rollout steering monitor 420 involves open loop integration and as such, the computation is only valid for a finite length of time. The outputs to the display means 44 are therefore removed prior to autopilot disengagement if the rollout duration exceeds a predetermined time interval.

The rollout steering monitor 420 also performs a computation in an ancillary portion 454 thereof to establish that the aircraft yaw axis is being controlled by the autopilot in proper phase with the position $Y_g$ and rate $\dot{Y}_g$ information to correct for disturbances. This is done by adding the rate $\dot{Y}_g$ and $Y_g$ position signals in summer 456, filtering the output of the summer 456 in filter 458 and adding the resultant signal to the yaw rate signal $\dot{\psi}$ in summer 460. The output of the summer 460 is filtered in filter 462 to generate the error signal $Y_{ge}$. If a significant error signal $Y_{ge}$ occurs as determined by threshold 464, a "degraded" performance logic signal is generated to verify any failure indications present in the autopilot yaw axis.

Figures 21A, 21B:
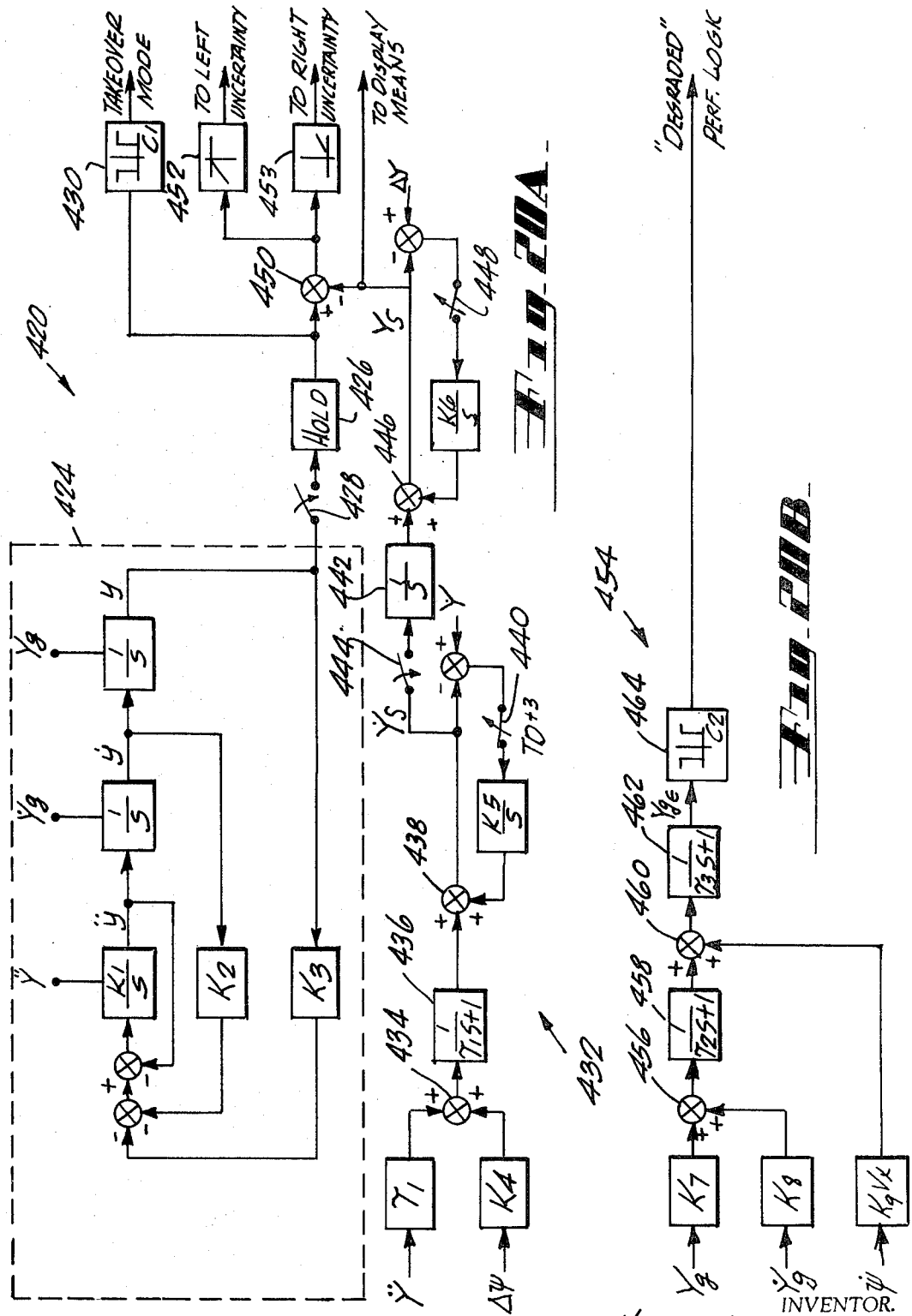
FIG. 21 is a diagram of a braking monitor.

The other portion of the rollout option is the braking function and the braking monitor 422 for generating this function is shown in FIG. 21. Wheel speed signals $W_1$ through $W_n$ are picked up from transducers 466 mounted in the wheel hubs. The wheel with the highest velocity is used as a source of velocity reference $v_x$ by a maximum value selector 468 to reduce if not eliminate error due to wheel slip. Distance traveled beyond threshold is then determined by summing in summer 470 the integral of this velocity out of integrator 472 with the position R of the aircraft at "TD + 3 sec." The latter estimation is determined from a computation used in the flare predictor monitor 106 where $$R = 3000 + 20.9 \frac{H}{1 + gs/2.75} \text{ until } H = 100 \text{ ft.}$$

and $$R = R/H = 100 \text{ ft.} - \int V_x dt \text{ thereafter.}$$

The ratio $v^2x/2a'_x$ supplies the extrapolated distance-to-stop based on current velocity $vx$ and deceleration, $a'x$. A smoothing filter 474 is used to average the deceleration signal and in general the filter 474 prevents the output of summer 470 from changing erratically. The sum of distance traveled from the runway threshold plus the extrapolated deceleration distance yields a value for the predicted stopping point relative to the runway threshold. If the aircraft is brought to a smooth halt (constant $a_x$), the prediction will be accurate and the output of summer 470 will not change during the rollout. On a long runway where the pilot is not interested in stopping early and consequently applies the brakes only intermittently, the output of summer 470 will, of course, vary over a considerable range.

If the observed deceleration $a'_x$ is below some minimum value which is a function of airspeed and threshold 476 such as to indicate the absence of any braking, the aforementioned indication of the distance presentation such as a color change will be triggered.

Manual Approach

The PAFAM 30 can also be used to monitor manual approaches when the aircraft is being flown by the pilot with reference to the flight director instrument in the aircraft. This manual approach mode differs from the previously described automatic modes of operation by the disabling of the "takeover" logic therein, the bypassing of the reversion inhibit function, the method of engagement and disengagement of the monitoring function, and the modification of the numerical values used by the individual models discussed above to reflect the different control laws which apply to an aircraft when it is being manually flown as opposed to when it is being flown by means of an autopilot. The "takeover" command and reversion inhibit function are removed because they have no meaning in the case of a manual approach. The performance assessment functions are modified to reflect the difference in the dynamics of the manually controlled approach as compared to the automatic approach. This modification is comprised mainly of removing or reducing the integral terms in the predictor models and the command models, modifying the command lags and allowing a wider tolerance for altitude control. To assure that the aircraft is maintaining a satisfactory spacial relationship with respect to the runway so as to permit a successful manual landing, it is only necessary for the pilot to check the display means 44 to see that it is indicating that a safe landing can still be accomplished. If the aircraft is being significantly jostled by winds or if deviations from the ILS beam centerline are sufficient at low altitudes, the combination of touchdown prediction and uncertainty can result in a condition indicative of a marginally acceptable landing situation.

Autopilot Predictor Controller

The present monitor 30 and especially the predictor models 102, 104, and 106 can be used not only to monitor the operation of the autopilot but also to actively change the gain parameters within the autopilot to achieve near-optimal performance thereof and simultaneously provide a definitive assessment of the resulting autopilot performance. This is done by providing selectable sets of parameter gains (K) to define $l$ through $n$ model configurations. Using one model configuration, the models 102, 104 and 106 are initialized to conform to the actual aircraft state. The models 102, 104 and 106 are then allowed to simulate the future aircraft behavior for a predetermined interval. During this interval, optimization criteria for the autopilot such as a minimum center line displacement, $\Delta Y$, at touchdown and minimum error derivation in longitudinal displacement and sink rate at touchdown from nominal values are computed and the results stored. Next, another model configuration is selected and the operation is repeated. When all $l$ through $n$ configurations have been investigated, the set of gains which produce the minimum values for the optimization criteria are used as the values to which the autopilot gains are adjusted. The predictor models 102, 104 and 106 with the chosen set of gains are then used to produce predictions of terminal or intermediate point conditions.

The entire cycle is repeated periodically to update the selected autopilot gains and the performance prediction. Normally the performance prediction is updated more frequently than the autopilot gains to assure accuracy of the prediction in a changing environment without imposing unnecessarily severe computational requirements.

Thus there has been shown and described a novel performance and failure assessment monitor for an automatic landing system which fulfill all of the objects and advantages sought therefor. Many changes, modifications, variations and other uses and applications of the subject PAFAM will, however, become apparent to those skilled in the art after considering the specification and the accompanying drawings. All such changes, modification, alterations, and other uses and applications which do not depart from the spirit and scope of the invention are deemed to be covered by the claims which follow.

What is claimed is:

1. Means for monitoring the operation of an aircraft during a landing maneuver including:
    means operatively connected to sensors on the aircraft for generating signals representative of the state of the aircraft with respect to a predetermined point on the ground;
    predictor means connected to receive some of said signals representative of the state of the aircraft for generating therefrom signals representative of the future state of the aircraft with respect to said predetermined ground point;
    means to store predetermined portions of said predictor means generated signals;
    means to compare said stored predictor signals of what should be happening with said state signals of what is happening and to generate signals representative of the correlation therebetween; and
    means for displaying said signals representative of the future state of the aircraft with respect to said predetermined ground point including means to display said correlation signals with respect to said predetermined point so that the uncertainty of the predictor signals can be judged.

2. The monitoring means defined in claim 1 wherein said predictor means operate in a time scale substantially faster than real time, said predictor means including:
    lateral predictor means for generating signals representative of the future lateral state of the aircraft with respect to said predetermined ground point;
    longitudinal predictor means for generating signals representative of the future longitudinal state of the aircraft with respect to said predetermined ground point;
    flare predictor means for generating signals representative of the predicted flare maneuver of the aircraft; and
    means to combine the signals from said longitudinal predictor means and said flare predictor means to produce signals representative of the predicted longitudinal position of the aircraft at landing touchdown.

3. The monitoring means defined in claim 1 including:
    altitude loss calculation means connected to receive said state signals and to calculate therefrom the vertical distance that will be traveled before the descent of the aircraft can be stopped;
    means for comparing said vertical distance output of said altitude loss calculation means to the altitude of the aircraft and for generating signals indicative of whether the aircraft can be held off the ground and;
    means for displaying landing and go around strategy based on whether the aircraft can be held off the ground.

4. The monitoring means defined in claim 1, wherein said predictor means include:
    means to predict the future state of the aircraft when the aircraft is being flown by an autopilot; and
    means to predict the future state of the aircraft when the aircraft is being flown by the pilot.

5. The monitoring means defined in claim 1, wherein said predictor means include:
    means to predict the future lateral state of the aircraft after the aircraft has touched down; and
    means to predict the distance along the runway that will be traveled to bring the aircraft to a stop.

6. The monitoring means defined in claim 1, including:
    threshold means connected to receive said correlation signals and to compare said correlation signals against predetermined levels, said threshold means generating output signals when said correlation signals indicate lack of correlation below said predetermined level; and
    means connected to receive said threshold means output for display of said lack of correlation.

7. The monitoring means defined in claim 1, including:
    failure verification means for verifying the existence of a failure, said failure verification means including means to compare failure indications from components of the aircraft with said correlation signals to determine if the failure indication is valid and if the failure indicating component is adversely affecting the operation of the aircraft, and means connected to inhibit the reversion of failure indicating components when the failure therein is not verified.

8. Means for monitoring the operation of an aircraft including:
    derivation means operatively connected to sensors on the aircraft for generating state variable signals which represent the physical state of the aircraft with respect to a predetermined reference;
    predictor means connected to receive selected state variable signals from said derivation means, said predictor means including model means for simulating the future physical states of the aircraft in reference to said state variable signals and for producing model signals representative of said future physical states;
    display means connected to said model means to display said future physical states of said aircraft;
    storage means for holding predetermined portions of said model signals; and
    comparitor means for comparing the correlation between said held portions of said model signals with selected state variable signals and for producing correlation signals representative of the correlation therebetween, said correlation signals being a measure of the certainty of said predictor means and being displayed as such by said display means.

9. The monitoring means defined in claim 8, wherein said model means include:
    a lateral predictor model for predicting the lateral position of the aircraft at landing touchdown thereof;
    a longitudinal predictor model; and
    a flare predictor model, the predictions of said longitudinal predictor model and said flare predictor model being combined to predict the longitudinal position of the aircraft at landing touchdown thereof.

10. The monitor means defined in claim 8, including:
    failure verification means connected to receive failure indications from components of the aircraft and correlation signals from said comparitor means, said failure verification outputs when failure indications and correlation signals confirming degraded performance are received thereby; and
    means responsive to said failure verification means output to allow operational components of the aircraft to be exchanged with those components whose failure has been so verified.

11. The monitor means defined in claim 10, including:
    first threshold means for comparing said correlation signals to first predetermined standards and for producing degraded performance signals to said failure verification means when said correlation signals are outside the predetermined standards; and
    second threshold means for comparing said correlation signals to secure predetermined standards which are outside the first predetermined standards, said second threshold means producing takeover signals which are displayed to the pilot by said display means.

12. The monitoring means defined in claim 8, including attitude command means, said attitude command means having:

command model means connected to said state variable signals which generate therefrom command outputs which are available to control automated flight controls of the aircraft.

13. The monitoring means defined in claim 8 including short period models for assessing the stability of the control of the aircraft, said short period models having:
   averaging means connected to sense the effective deflection of control surfaces on said aircraft and to produce outputs representative thereof:
   filter means connected to receive predetermined state variable signals for converting said predetermined state variable signals into equivalent control surface command signals; and
   correlation means connected to receive said equivalent control surface command signals and said averaging means outputs as inputs thereto, said correlation means producing correlation outputs based on the correlation of the inputs fed thereto, whereby said correlation outputs are a measure of the stability of the control of the aircraft.

14. The monitoring means defined in claim 8 including means for monitoring the rollout of the aircraft after the aircraft has landed, said rollout monitoring means having:
   predictor means for generating signals representative of the future lateral excursion of the aircraft from state variable signals fed thereto;
   means for generating signals representative of the actual lateral displacement of the aircraft on the runway; and
   means for combining said future lateral excursion signals and said lateral displacement signals into uncertainty signals; whereby said uncertainty signals and said lateral displacement signals are sent to said display means for display.

15. Means for controlling the gain parameters of an autopilot of an aircraft to achieve optional performance thereof and for assessing the resulting autopilot performance, said autopilot controlling means including:
   means for generating signals representative of the state of the aircraft as sensed by sensors in the aircraft;
   prediction means having models with selectable sets of parameter gains therein, said models being initialized by selected state signals and thereafter generating output signals representative of future aircraft behavior therefrom using said selectable sets of parameter gains; and
   means for holding and comparing the outputs of said models for minimum values, whereby said set of parameter gains producing the minimum values can be used to reconfigure the gain parameters of the autopilot.

16. The means defined in claim 15 including:
   display means connected to receive and display said model output signals when the set of parameter gains producing the minimum value is being used in said models.

17. The means defined in claim 15 wherein said models include:
   a lateral predictor model for predicting future lateral positions of the aircraft for a predetermined interval;
   a longitudinal predictor model; and
   a flare predictor model; the predictions of said longitudinal predictor model and said flare predictor model being combined to predict the longitudinal positions of the aircraft for a predetermined interval.

18. Means for monitoring the operation of an aircraft during a landing maneuver including:
   means operatively connected to sensors on the aircraft for generating signals representative of the state of the aircraft with respect to a predetermined point on the ground;
   predictor means connected to receive some of said signals representative of the state of the aircraft for generating therefrom signals representative of the future state of the aircraft with respect to said predetermined ground point, said predictor means including altitude loss calculation means connected to receive some of said state signals and to calculate therefrom the vertical distance that will be traveled before the descent of the aircraft can be stopped;
   means for comparing said vertical distance output of said altitude loss calculation means to the altitude of the aircraft and for generating signals indicative of whether the aircraft can be held off the ground; and
   means for displaying said signals representative of the future state of the aircraft with respect to said predetermined ground point including means for displaying landing and go around strategy based on whether the aircraft can be held off the ground.

19. Means for monitoring the operation of an aircraft during a landing maneuver including:
   means operatively connected to sensors on the aircraft for generating signals representative of the state of the aircraft with respect to a predetermined point on the ground;
   predictor means connected to receive some of said signals representative of the state of the aircraft for generating therefrom signals representative of the future state of the aircraft with respect to said predetermined ground point, said predictor means including means to predict the future state of the aircraft when the aircraft is being flown by an autopilot and means to predict the future state of the aircraft when the aircraft is being flown by the pilot; and
   means for displaying said signals representative of the future state of the aircraft with respect to said predetermined ground point.

20. Means for monitoring the operation of an aircraft during a landing maneuver including:
   means operatively connected to sensors on the aircraft for generating signals representative of the state of the aircraft with respect to a predetermined point on the ground;
   predictor means connected to receive some of said signals representative of the state of the aircraft for generating therefrom signals representative of the future state of the aircraft with respect to said predetermined ground point, said predictor means including means to predict the distance along the runway that will be traveled to bring the aircraft to a stop and means to predict the future lateral state of the aircraft after the aircraft has touched down; and
   means for displaying said signals representative of the future state of the aircraft with respect to said predetermined ground point.

21. Means for monitoring the operation of an aircraft including:
   derivation means for generating state variable signals which represent the physical state of the aircraft with respect to a predetermined reference;
   predictor means connected to receive selected state variable signals from said derivation means, said predictor means including model means for simulating the future physical states of the aircraft in reference to said state variable signals and for producing model signals representative of said future physical states;
   means for assessing the environmental disturbances through which the aircraft may be flying, said environmental assessment means having means connected to predetermined state variable signals for weighting and combining them, and means for averaging said combined predetermined state variable signals into signals representative of an assessment of the environmental disturbances through which said aircraft is flying; and
   display means connected to said model means and said assessment means to display said predicted future physical states of said aircraft and the uncertainty thereof due to the environmental disturbances.

22. Means for monitoring the operation of an aircraft including:

derivation means operatively connected to sensors on the aircraft for generating state variable signals which represent the physical state of the aircraft with respect to a predetermined reference;

predictor means connected to receive selected state variable signals from said derivation means, said predictor means including model means comprised of a lateral predictor model for predicting the lateral position of the aircraft at landing touchdown thereof, a longitudinal predictor model, and a flare predictor model, the predictions of said longitudinal predictor model and said flare predictor model being combined to predict the longitudinal position of the aircraft at landing touchdown thereof; and display means connected to said model means to display said lateral and longitudinal position predictions of said aircraft at landing touchdown thereof.

23. Means for monitoring the operation of an aircraft including:

derivation means operatively connected to sensors on the aircraft for generating state variable signals which represent the physical state of the aircraft with respect to a predetermined reference;

predictor means connected to receive selected state variable signals from said derivation means, said predictor means including model means for simulating the future physical states of the aircraft in reference to said state variable signals and for producing model signals representative of said future physical states, said model means including short period models for assessing the stability of the control of the aircraft, said short period models having averaging means connected to sense the effective deflection of control surfaces on said aircraft and to produce outputs representative thereof, filter means connected to receive predetermined state variable signals for converting said predetermined state variable signals into equivalent control surface command signals, and correlation means connected to receive said equivalent control surface command signals and said averaging means outputs as inputs thereto, said correlation means producing correlation outputs based on the correlation of the inputs fed thereto, whereby said correlation outputs are a measure of the stability of the control of the aircraft; and display means connected to said model means to display said future physical states of said aircraft.

24. Means for monitoring the operation of an aircraft including:

derivation means operatively connected to sensors on the aircraft for generating state variable signals which represent the physical state of the aircraft with respect to a predetermined reference;

predictor means connected to receive selected state variable signals from said derivation means, said predictor means including model means for simulating the future physical states of the aircraft in reference to said state variable signals and for producing model signals representative of said future physical states;

display means connected to said model means to display said future physical states of said aircraft; and attitude command means having command model means connected to said state variable signals which generate therefrom command outputs which are available to control automated flight controls of the aircraft.

25. The monitoring means defined in claim 24, including:

failure verification means for verifying failure indications from components of the aircraft through comparison with similar indications and wherein said attitude command means also include:

means to compare said command outputs of said command model means with outputs of the aircraft autopilot and for producing command correlation signals therefrom, and first threshold means for comparing said command correlation signals to first predetermined standards and for producing degraded performance signals to said failure verification means for comparison with said failure indications.

26. The monitoring means defined in claim 25, wherein said attitude command means also include:

second threshold means for comparing said command correlation signals to second predetermined standards which are outside the first predetermined standards, and second threshold means producing takeover signals which are displayed to the pilot by said display means.

27. Means for monitoring the operation of an aircraft including:

derivation means operatively connected to sensors on the aircraft for generating state variable signals which represent the physical state of the aircraft with respect to a predetermined reference including means for generating signals representative of the actual lateral displacement of the aircraft on a runway;

predictor means connected to receive selected state variable signals from said derivation means, said predictor means including model means for simulating the future physical states of the aircraft in reference to said state variable signals and for producing model signals representative of said future physical states including means for generating signals representative of the future lateral excursion of the aircraft from state variable signals fed thereto;

display means; and means for combining said future lateral excursion signals and said lateral displacement signals into uncertainty signals, whereby said uncertainty signals and said lateral displacement signals are sent to said display means for display.

28. The monitoring means defined in claim 27 including:

threshold means connected to receive said future lateral excursion signals, said threshold means producing an output to said display means for display when said future lateral excursion signals exceed predetermined levels.

29. The monitoring means defined in claim 27 including:

means for determining the distance the aircraft has travelled on the runway after landing;

means for determining the distance the aircraft travels past a predetermined point on the runway before landing;

means for computing the stopping distance of the aircraft from its velocity and acceleration; and means for combining the aforesaid distances into a signal representative of the distance the aircraft will travel beyond the predetermined point before stopping, which stopping signal is fed to said display means.

30. The monitoring means defined in claim 29 including:

means for generating a signal representative of the deceleration of the aircraft; and threshold means for producing an output for display on said display means when said deceleration signal is below a predetermined level set in said threshold means.

* * * * *